United States Patent
Tomoda

(10) Patent No.: US 12,464,316 B2
(45) Date of Patent: Nov. 4, 2025

(54) ESTIMATION SYSTEM, ESTIMATION METHOD, AND INFORMATION STORAGE MEDIUM

(71) Applicant: Rakuten Group, Inc., Tokyo (JP)

(72) Inventor: Kyosuke Tomoda, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 896 days.

(21) Appl. No.: 17/702,993

(22) Filed: Mar. 24, 2022

(65) Prior Publication Data

US 2022/0312150 A1 Sep. 29, 2022

(30) Foreign Application Priority Data

Mar. 25, 2021 (JP) ................................. 2021-051459

(51) Int. Cl.
*H04W 4/02* (2018.01)
*G06N 20/00* (2019.01)

(52) U.S. Cl.
CPC ............ *H04W 4/023* (2013.01); *G06N 20/00* (2019.01)

(58) Field of Classification Search
CPC ............................... H04W 4/023; G06N 20/00
USPC ....................................................... 455/456.1
See application file for complete search history.

(56) References Cited

U.S. PATENT DOCUMENTS

| | | | |
|---|---|---|---|
| 10,509,793 B2 | 12/2019 | Suzuki et al. | |
| 2014/0274022 A1* | 9/2014 | Bell | H04W 8/16 455/418 |
| 2015/0161665 A1 | 6/2015 | Grimes et al. | |
| 2018/0302741 A1 | 10/2018 | Ikemoto et al. | |

FOREIGN PATENT DOCUMENTS

| | | |
|---|---|---|
| CN | 110414732 B | 9/2020 |
| CN | 112270349 A | 1/2021 |
| CN | 112488155 A | 3/2021 |
| JP | 2017-502401 A | 1/2017 |
| JP | 2018-041189 A | 3/2018 |
| JP | 2018-101375 A | 6/2018 |

OTHER PUBLICATIONS

Extended European Search Report dated Nov. 25, 2022 in Application No. 21895924.5.
International Search Report of PCT/JP2021/012539 dated Jun. 15, 2021 [PCT/ISA/210].

* cited by examiner

*Primary Examiner* — Michael R Neff
(74) *Attorney, Agent, or Firm* — Sughrue Mion, PLLC

(57) ABSTRACT

Provided is an estimation system including at least one processor configured to: acquire position information on a position of another location visited by a user who has visited an estimation target location which is a location for which an attribute is to be estimated; acquire a positional relationship between a position of the estimation target location and the position indicated by the position information; and estimate the attribute of the estimation target location based on the positional relationship.

18 Claims, 21 Drawing Sheets

FIG.4
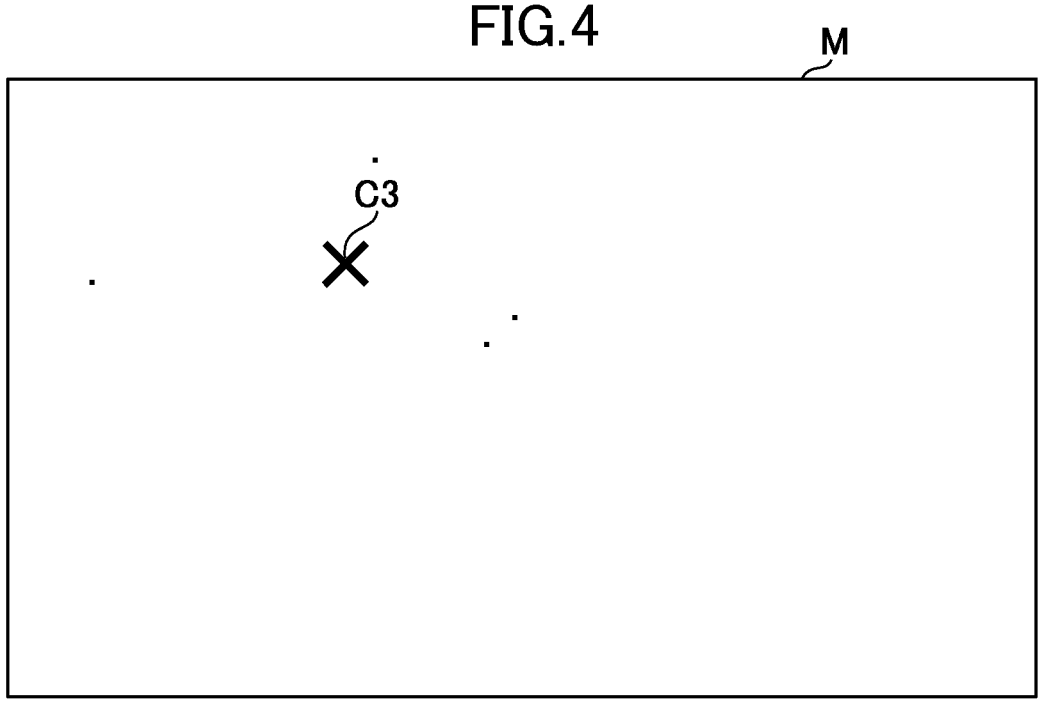
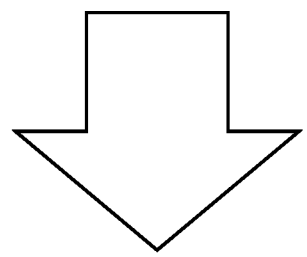
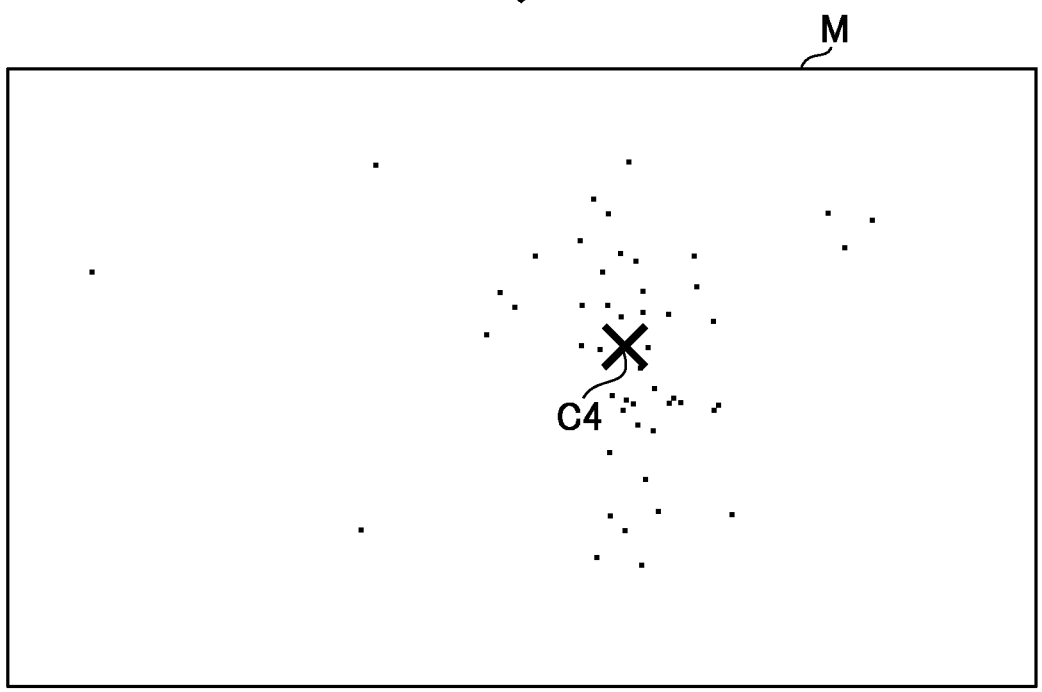

FIG.7

| USER ID | FULL NAME | HISTORY INFORMATION | | | | USER ATTRIBUTE | | | CENTRAL PLACE |
|---|---|---|---|---|---|---|---|---|---|
| | | POSITION | LOCATION ATTRIBUTE | DATE AND TIME | ... | AGE | RESIDENCE | ... | |
| u00001 | TARO YAMADA | (Xa1,Ya1) | CONVENIENCE STORE | 2021/3/21 10:25:04 | ... | MALE IN 20'S | ... MINATO-WARD, TOKYO | ... | (Xb1,Yb1) |
| | | (Xa2,Ya2) | TRAIN STATION | 2021/3/21 12:02:51 | ... | | | | |
| | | (Xa3,Ya3) | CAFE | 2021/3/21 15:22:14 | ... | | | | |
| | | ... | ... | ... | ... | | | | |
| u00002 | AKIKO ITO | (Xa10,Ya10) | SUPERMARKET | 2020/4/14 12:11:45 | ... | FEMALE IN 30'S | ... YOKOHAMA CITY, KANAGAWA | ... | (Xb2,Yb2) |
| | | (Xa11,Ya11) | AIRPORT | 2020/4/14 15:42:12 | ... | | | | |
| | | (Xa12,Ya12) | OFFICE BUILDING | 2020/4/14 18:02:24 | ... | | | | |
| ... | ... | ... | ... | ... | ... | ... | ... | ... | ... |

| DEVICE ID | POSITION | LOCATION ATTRIBUTE |
|---|---|---|
| m00001 | (Xc1,Yc1) | CONVENIENCE STORE |
| m00002 | (Xc2,Yc2) | TRAIN STATION |
| m00003 | (Xc3,Yc3) | CAFE |
| m00004 | (Xc4,Yc4) | EVENT VENUE |
| ⋮ | ⋮ | ⋮ |

| | INPUTS | | | | | | | OUTPUT |
|---|---|---|---|---|---|---|---|---|
| DAYTIME CENTRAL PLACE | DAYTIME DEGREE OF VARIATION | DAYTIME USAGE COUNT | OVERALL CENTRAL PLACE | OVERALL DEGREE OF VARIATION | OVERALL USAGE COUNT | USER ATTRIBUTE | LOCATION ATTRIBUTE | CENTRAL PLACE |
| (Xd1,Yd1) | 12.8 | 4 | (Xe1,Ye1) | 17.6 | 7 | MALE IN 30'S, ... TOKYO | CONVENIENCE STORE | (Xf1,Yf1) |
| (Xd2,Yd2) | 72.5 | 3 | (Xe2,Ye2) | 25.4 | 8 | FEMALE IN 20'S, ... KANAGAWA | SUPERMARKET | (Xf2,Yf2) |
| (Xd3,Yd3) | 42.4 | 5 | (Xe3,Ye3) | 52.3 | 11 | MALE IN 40'S, ... SAITAMA | TRAIN STATION | (Xf3,Yf3) |
| ... | ... | ... | ... | ... | ... | ... | ... | ... |

FIG.10

| POSITION | INFORMATION | DB4 |
|---|---|---|
| (Xg1,Yg1) | INFORMATION ON SUPERMARKET A | |
| (Xg2,Yg2) | INFORMATION ON CONVENIENCE STORE B | |
| (Xg3,Yg3) | INFORMATION ON RESTAURANT C | |
| (Xg4,Yg4) | INFORMATION ON TRAIN STATION D | |
| ⋮ | ⋮ | |

FIG.15

| DEVICE ID | POSITION | LOCATION ATTRIBUTE | USE ATTRIBUTE |
|---|---|---|---|
| m00001 | (Xc1,Yc1) | CONVENIENCE STORE | FOR TOURISTS |
| m00002 | (Xc2,Yc2) | TRAIN STATION | FOR TOURISTS |
| m00003 | (Xc3,Yc3) | CAFE | FOR NEIGHBORHOOD RESIDENTS |
| m00004 | (Xc4,Yc4) | EVENT VENUE | FOR NEIGHBORHOOD RESIDENTS |
| ⋮ | ⋮ | ⋮ | ⋮ |

| CONDITION | USE ATTRIBUTE |
|---|---|
| LESS THAN 20 km | FOR NEIGHBORHOOD RESIDENTS |
| 20 km OR LONGER | FOR TOURISTS |

| AREA | CONDITION | USE ATTRIBUTE |
|---|---|---|
| PROVINCIAL | LESS THAN 20 km | FOR NEIGHBORHOOD RESIDENTS |
| | 20 km OR LONGER | FOR TOURISTS |
| URBAN | LESS THAN 5 km | FOR NEIGHBORHOOD RESIDENTS |
| | 5 km OR LONGER | FOR TOURISTS |
| ⋮ | ⋮ | ⋮ |

| LOCATION ATTRIBUTE | CONDITION | USE ATTRIBUTE |
|---|---|---|
| OUTLET MALL | LESS THAN 50 km | FOR NORMAL SHOPPING |
| | 50 km OR LONGER | FOR TOURISTS |
| CONVENIENCE STORE | LESS THAN 5 km | FOR NORMAL SHOPPING |
| | 5 km OR LONGER | FOR TOURISTS |
| ⋮ | ⋮ | ⋮ |

| DEGREE OF VARIATION | CONDITION | USE ATTRIBUTE |
|---|---|---|
| LARGE | LESS THAN 100 km | FOR GOURMET USERS |
| | 100 km OR LONGER | FOR TOURISTS |
| SMALL | LESS THAN 20 km | FOR GOURMET USERS |
| | 20 km OR LONGER | FOR TOURISTS |
| ⋮ | ⋮ | ⋮ |

DT

ESTIMATION SYSTEM, ESTIMATION METHOD, AND INFORMATION STORAGE MEDIUM

CROSS-REFERENCE TO RELATED APPLICATION

The present application claims priority from Japanese application JP 2021-051459 filed on Mar. 25, 2021, the content of which is hereby incorporated by reference into the application.

BACKGROUND OF THE INVENTION

1. Field of the Invention

The present disclosure relates to an estimation system, an estimation method, and an information storage medium.

2. Description of the Related Art

Hitherto, for various purposes, attributes have been associated with locations visited by users in some cases. For example, in JP 2018-101375 A, there is described a technology for preparing in advance a genre information group in which a shop identifier of a shop, which is an example of a location, and a shop genre, which is an example of an attribute, are associated with each other, and estimating a consumption type of a user based on the shop genre associated with the shop identifier of the shop used by the user.

SUMMARY OF THE INVENTION

However, the genre information group as described in JP 2018-101375 A is merely a static shop genre specified in advance, and thus is not a dynamic shop genre showing how individual shops are actually used. That is, the shop genre as described in JP 2018-101375 A is merely a rough attribute determined by the administrator, and is not a highly accurate attribute reflecting the actual situation in which individual shops are used.

One object of the present disclosure is to accurately estimate an attribute of a location.

According to at least one embodiment of the present disclosure, there is provided an estimation system including at least one processor configured to: acquire position information on a position of another location visited by a user who has visited an estimation target location which is a location for which an attribute is to be estimated; acquire a positional relationship between a position of the estimation target location and the position indicated by the position information; and estimate the attribute of the estimation target location based on the positional relationship.

BRIEF DESCRIPTION OF THE DRAWINGS

FIG. 4 is a diagram for illustrating an example of a case in which a degree of variation in locations visited by a veteran user when the veteran user was a novice user is large.

FIG. 7 is a table for showing a data storage example of a user database.

FIG. 8 is a table for showing a data storage example of a location database.

FIG. 9 is a table for showing a data storage example of a training database.

FIG. 10 is a table for showing a data storage example of an information database.

FIG. 15 is a table for showing a data storage example of a location database in the second embodiment.

FIG. 16 is a table for showing a data storage example of attribute definition data.

FIG. 19 is a table for showing a data storage example of attribute definition data in Modification Example (2-1) of the present disclosure.

FIG. 20 is a table for showing a data storage example of attribute definition data in Modification Example (2-2) of the present disclosure.

FIG. 21 is a table for showing a data storage example of attribute definition data in Modification Example (2-3) of the present disclosure.

DETAILED DESCRIPTION OF THE INVENTION

1. First Embodiment

Now, an example of an estimation system according to a first embodiment of the present disclosure is described. In the first embodiment, an estimation system which estimates a central place of a location that a user of a communication service is likely to visit in the future is taken as an example. The estimation system is applicable to any other services. Examples of other services to which the estimation system may be applied are described later in modification examples of the present disclosure.

[1-1. Overall Configuration of Estimation System]

Figure 1:
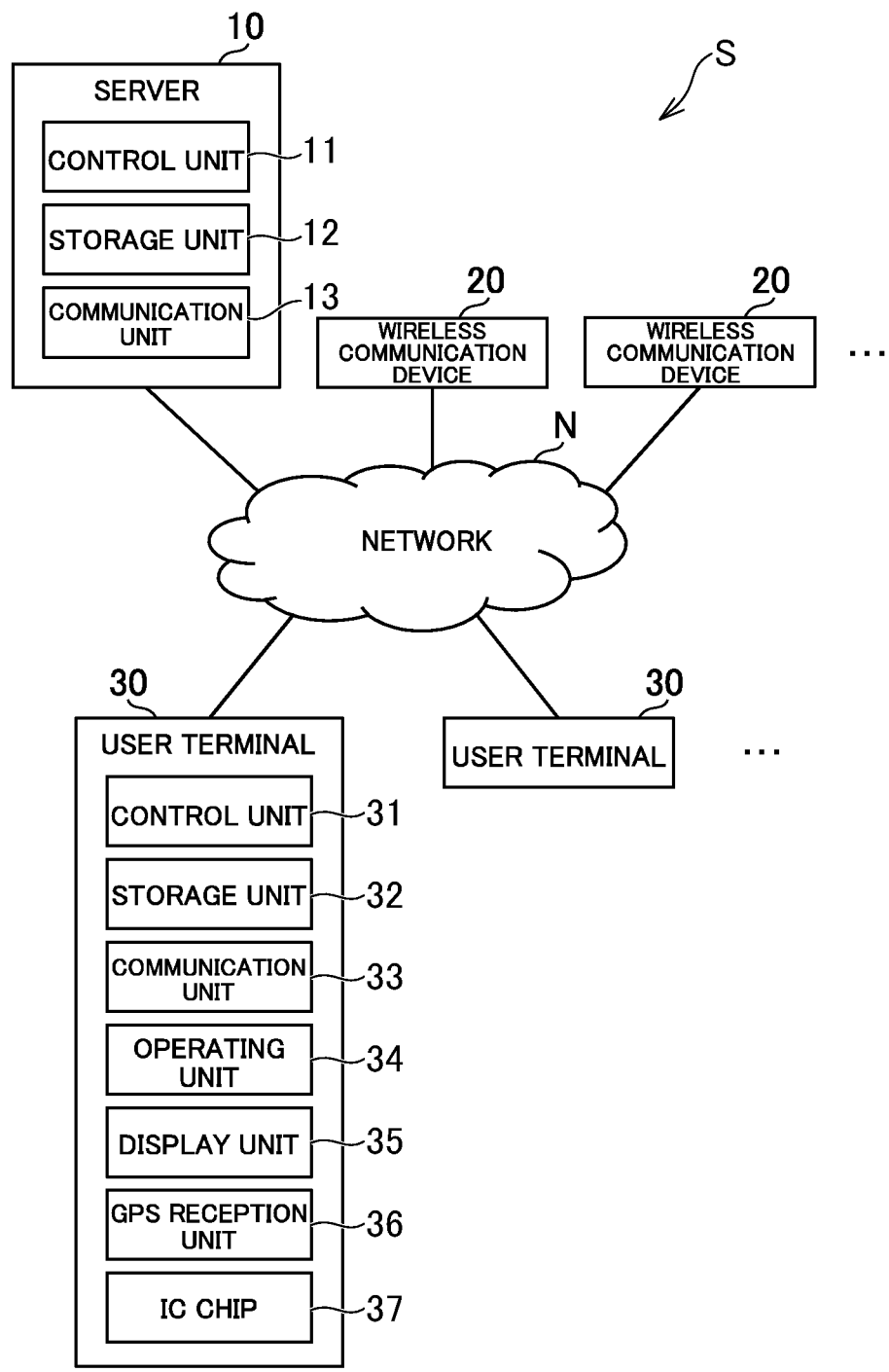
FIG. 1 is a diagram for illustrating an example of an overall configuration of an estimation system.

FIG. 1 is a diagram for illustrating an example of an overall configuration of the estimation system. As illustrated in FIG. 1, an estimation system S includes a server 10, wireless communication devices 20, and user terminals 30. Each of the server 10, the wireless communication devices 20, and the user terminals 30 can be connected to a network N, for example, the Internet. The estimation system S is not limited to the example illustrated in FIG. 1, as long as the estimation system S includes at least one computer.

The server 10 is a server computer. The server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

Each of the wireless communication devices 20 is a device capable of wireless communication. For example, the wireless communication device 20 is an access point of a wireless LAN such as Wi-Fi (trademark), an access point corresponding to a communication standard such as Bluetooth (trademark), or a base station of a mobile phone. The wireless communication device 20 itself can be a device conforming to various known communication standards. The wireless communication device 20 may be arranged at any location.

Each of the user terminals 30 is a computer to be operated by a user. For example, the user terminal 30 is a smartphone, a tablet computer, a wearable terminal, or a personal computer. The user terminal 30 includes a control unit 31, a storage unit 32, a communication unit 33, an operating unit 34, a display unit 35, a GPS reception unit 36, and an IC chip 37. Physical configurations of the control unit 31, the storage unit 32, and the communication unit 33 are the same as those of the control unit 11, the storage unit 12, and the communication unit 13, respectively.

The operating unit 34 is an input device such as a touch panel. The display unit 35 is a liquid crystal display or an organic EL display. The GPS reception unit 36 includes a receiver which receives signals from satellites. The GPS reception unit 36 is used to acquire a current position or a current date and time. The IC chip 37 may be a chip of any standards, for example, a chip of FeliCa (trademark) or a chip of a so-called Type A or Type B among the non-contact type standards.

At least one of programs or data stored in the server 10, the wireless communication device 20, and the user terminal 30 may be supplied thereto via the network N. Further, each of the server 10, the wireless communication device 20, and the user terminal 30 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

[1-2. Outline of First Embodiment]

In order to start using the communication service, the user operates the user terminal 30 to perform a predetermined use registration. When the user has completed the use registration, a user ID that can uniquely identify the user is issued. For example, the user ID is recorded in the user terminal 30. When the user ID has been issued, the user can use the communication service.

Figure 2:
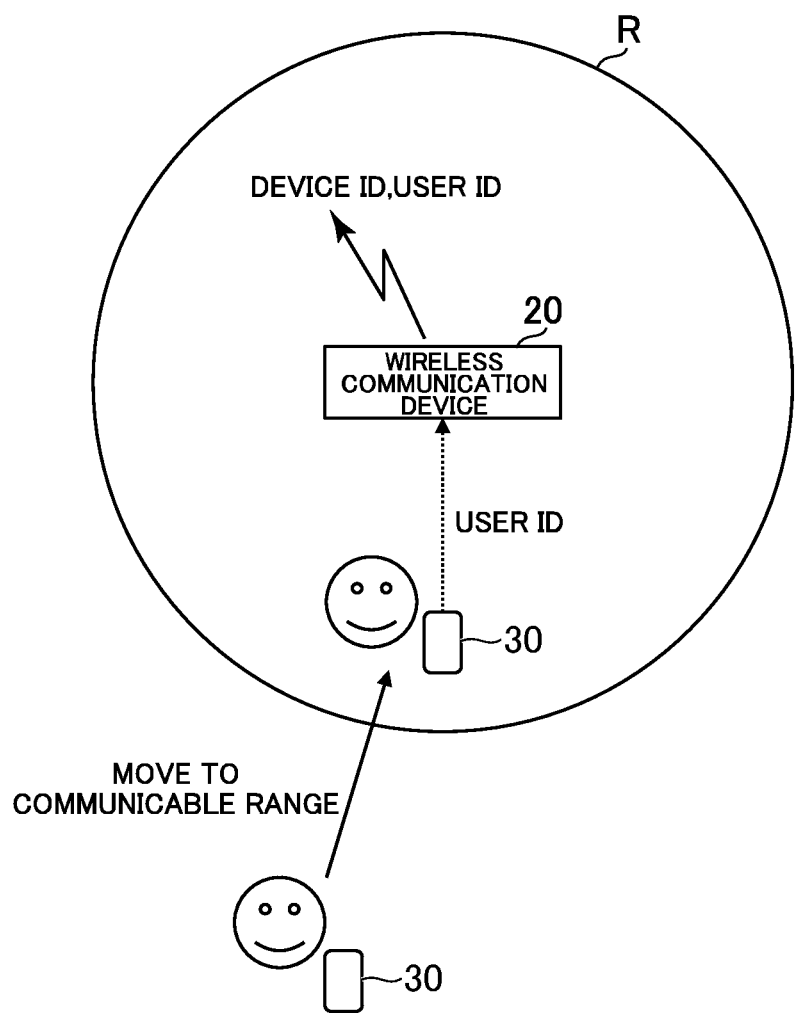
FIG. 2 is a diagram for illustrating an example of how a communication service is used by a user.

FIG. 2 is a diagram for illustrating an example of how the communication service is used by the user. In the first embodiment, a case in which the wireless communication device 20 is an access point of a wireless LAN is taken as an example. As illustrated in FIG. 2, when the user turns on the wireless communication function of the user terminal 30 and moves to a communicable range R in which the radio waves of a wireless communication device 20 can reach, the user can connect the user terminal 30 to the wireless communication device 20 and use the communication service.

For example, when the user moves to the communicable range R and launches a browser of the user terminal 30, the user is requested to input the user ID for authentication. When the user inputs the user ID from the operation unit 34, the user terminal 30 transmits the input user ID to the wireless communication device 20. Instead of the user inputting the user ID, the user ID stored in the user terminal 30 may be transmitted to the wireless communication device 20.

The wireless communication device 20 transmits, to the server 10, a device ID that can uniquely identify the wireless communication device 20 and the user ID received from the user terminal 30. The device ID is assumed to be stored in the storage unit included in the wireless communication device 20. The server 10 can identify which user is in the communicable range R of which wireless communication device 20 based on the device ID and the user ID.

When the server 10 receives the device ID and the user ID from the wireless communication device 20, the server 10 confirms the validity of the user ID. When the server 10 has confirmed the validity of the user ID, the server 10 permits use of the communication service. After that, the user can connect the user terminal 30 to the wireless communication device 20 and use the communication service.

The wireless communication device 20 is arranged in various locations, and the user can use the wireless communication device 20 of any location. For example, the wireless communication device 20 is arranged in a location such as a shop, a train station, an airport, an event venue, an accommodation facility, a public facility, a tourist facility, a stadium, or an office building, and the user can connect to the wireless communication device 20 arranged at the location to which the user has moved and use the communication service.

The estimation system S acquires, based on a usage track record of the communication service by the user, the central place of a plurality of locations that the user often visits, and provides information which is based on the central place, for example, provides information on the locations in the vicinity of the central place. This central place can be referred to as a location that seems to be of interest to the user. At the central place, there may be some kind of facility, or there may not be any facility in particular.

The information provided based on the central place of the user may be any information, for example, information on a shop in the vicinity of the central place, a benefit that is usable in the shop, or information on an event in the vicinity of the central place. The estimation system S can also acquire the current position of the user terminal 30 in real time and provide information which is based on the current position. However, when the central place can be acquired, useful information based on the central place can be provided at an earlier stage.

For example, when the user is a veteran user who has been using the communication service for a long time and frequently, there is a sufficient usage track record. As a result, for veteran users, the estimation system S can acquire a highly accurate central place by calculating the central place from the past usage track record. Meanwhile, when the user is a novice user who has just started to use the communication service, the usage track record is not sufficient. As a result, for novice users, the estimation system S may not be able to acquire a central place having a high accuracy even when the central place is calculated from the past usage track record.

Thus, estimation system S can acquire a highly accurate central place even for a novice user by using a learning model that has learned the trend of veteran users to estimate the central place of a plurality of locations that are likely to be visited by the novice user in the future. In top secret and original research carried out by the inventor(s), it has been confirmed that, for veteran users, there tends to be a correlation between a degree of variation in the distance from the central place of a plurality of locations visited when the veteran user was a novice user to each of those locations and the central place after the veteran user has accumulated a sufficient usage track record.

Figure 3:
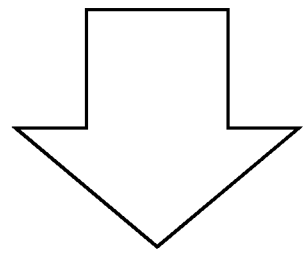
FIG. 3 is a diagram for illustrating an example of a case in which a degree of variation in locations visited by a veteran user when the veteran user was a novice user is small.

FIG. 3 is a diagram for illustrating an example of a case in which the degree of variation in locations visited by a veteran user when the veteran user was a novice user is small. In FIG. 3, the locations of the wireless communication device 20 connected by a veteran user are plotted on a map M of an area in which the communication service is provided. In FIG. 3, roads, buildings, and the like on the map M are omitted. Further, in FIG. 3, the central place when the veteran user was a novice user is indicated by the reference symbol "C1", and the central place after the veteran user has accumulated a sufficient usage track record is indicated by the reference symbol "C2".

For the veteran user of FIG. 3, the degree of variation in the distance between the central place C1 of the plurality of locations visited when the veteran user was a novice user and the position of each location is small. That is, the plurality of locations visited when the veteran user was a novice user are packed closely to each other. It has been confirmed by the top secret and original research carried out by the inventor(s) that, as illustrated in FIG. 3, such a veteran user tends not to have much deviation between the central place C1 when the veteran user was a novice user and the central place C2 after a sufficient usage track record has been accumulated.

The learning model in the first embodiment has learned a trend of veteran users like that illustrated in FIG. 3. Thus, when the degree of variation in the distance between the central place of a plurality of locations visited by a novice user up to the current point in time and the position of each location is small, the central place of the novice user in the future is estimated to a position not far from the current central place. The learning model in the first embodiment has also learned other elements, such as a usage count, age, or residence of veteran users, but when the above-mentioned degree of variation is small, the learning model emphasizes the current central place over other elements.

FIG. 4 is a diagram for illustrating an example of a case in which the degree of variation in locations visited by a veteran user when the veteran user was a novice user is large. In FIG. 4, the central place when the veteran user was a novice user is indicated by the reference symbol "C3", and the central place after the veteran user has accumulated a sufficient usage track record is indicated by the reference symbol "C4".

For the veteran user of FIG. 4, the degree of variation in the distance between the central place C3 of the plurality of locations visited when the veteran user was a novice user and the position of each location is large. That is, the plurality of locations visited when the veteran user was a novice user are scattered from each other. For example, the central place C3 is influenced by the positions of distant locations that the veteran user happened to visit or by the positions of locations not in the usual living zone of the veteran user. It has been confirmed by the top secret and original research carried out by the inventor(s) that such a veteran user tends to have a large deviation between the central place C3 when the veteran user was a novice user and the central place C4 after a sufficient usage track record has been accumulated.

The learning model in the first embodiment has also learned a trend of veteran users like that illustrated in FIG. 4. Thus, when the degree of variation in the distance between the central place of a plurality of locations visited by a novice user up to the current point in time and the position of each location is large, the central place of the novice user in the future is estimated to a position far from the current central place to some extent. When the degree of variation is small, the learning model emphasizes other elements, such as the usage count, age, or residence, over the current central place.

Figure 5:
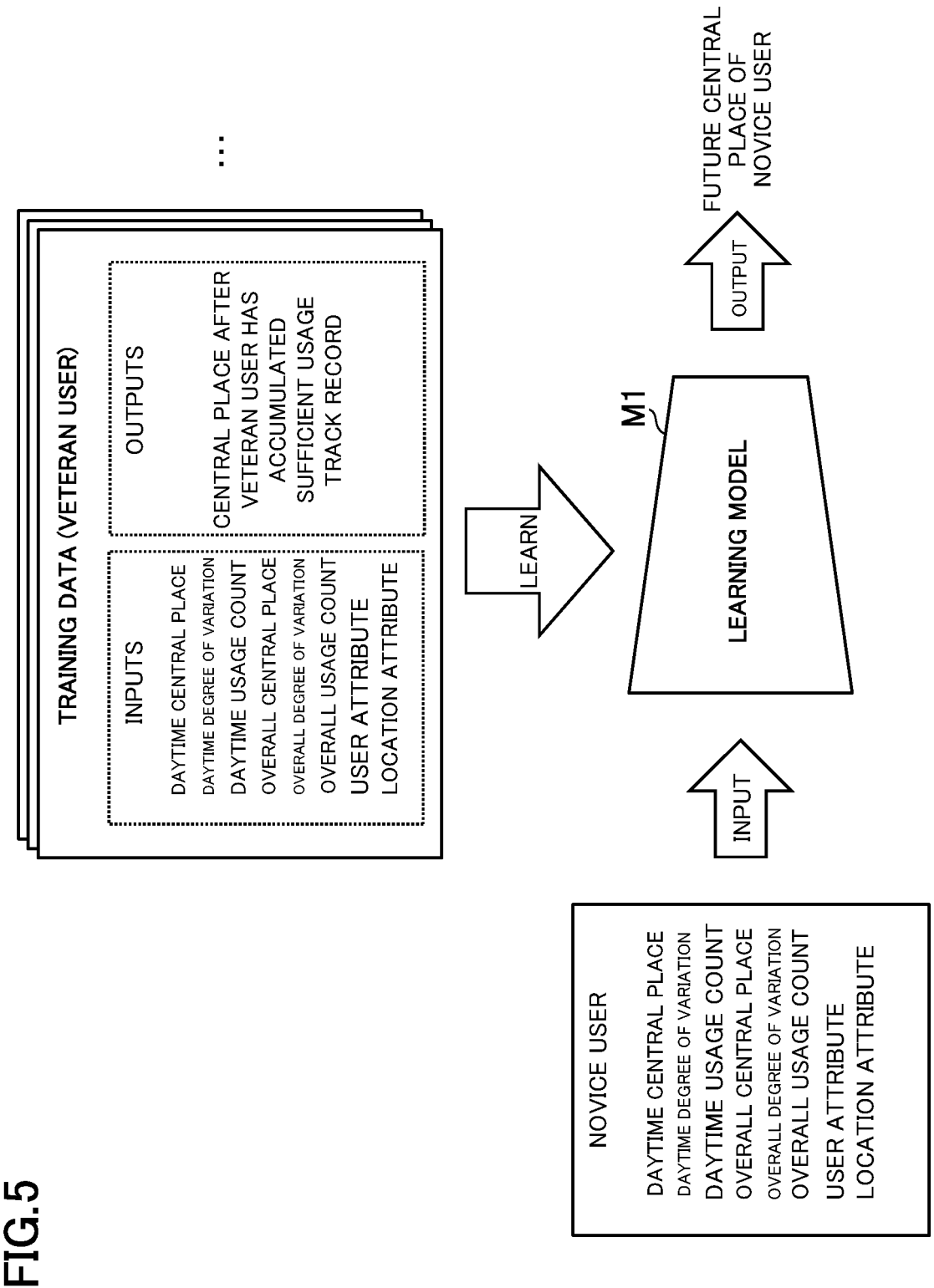
FIG. 5 is a diagram for illustrating an outline of a learning model in a first embodiment of the present disclosure.

FIG. 5 is a diagram for illustrating an outline of the learning model in the first embodiment. As illustrated in FIG. 5, a learning model M1 has learned training data created based on the usage track record of veteran users. The input portion of the training data has the same format as the actual input to the learning model M1, and the output portion of the training data has the same format as the actual output from the learning model M1. The input portion of the training data is created based on the usage track record when the veteran user was a novice user.

In the first embodiment, the locations that a user visits during the day and the locations that the user visits at night may be very different, and hence a case in which the daytime central places and the nighttime central places are estimated by using separate learning models M1 is described. In FIG. 5, a learning model M1 for daytime is illustrated, but the learning model M1 for nighttime has the same basic mechanism except that the input portion becomes nighttime information.

As illustrated in FIG. 5, as the input portion, the training data includes "daytime central place", "daytime degree of variation", "daytime usage count", "overall central place", "overall degree of variation", "overall usage count", "user attribute", and "location attribute" when the veteran user was a novice user. As described above, the degree of variation is the degree of variation in the distance between the central place of a plurality of locations and the position of each location. As used herein, "overall" is the period for one entire day combining daytime and nighttime. The input portion is information indicating a feature when the veteran user was a novice user.

The user attribute is an attribute for classifying the user. The user attribute may be any information that can classify the user in some way, for example, age, residence, gender, occupation, annual income, or a combination thereof. The user attribute is sometimes also referred to as demographic information. The user attribute is not limited to the examples given in the first embodiment, and may be any kind of information that can classify the user in some way. The user attribute can also be referred to as a nature, type, category, or genre of the user.

The location attribute is an attribute for classifying the location. The location attribute may be any information that can classify the location in some way, for example, the type (type of industry) of good or service provided at the location, a building at the location, the area to which the location belongs, access to the location, or a combination thereof. The location attribute is not limited to the examples given in the first embodiment, and is any kind of information that can classify the location in some way. The location attribute can also be referred to as the nature, type, category, or genre of the location. In the first embodiment, the training data is assumed to include the location attribute of the location most visited by a veteran user.

As illustrated in FIG. 5, as the output portion, the training data includes a central place after the veteran user has accumulated a sufficient usage track record. This central place is the central place that becomes the correct answer. This central place may be a central place calculated from the usage track record for all periods, or a central place calculated from the usage track record for a partial period including the current point in time.

As illustrated in FIG. 5, in order to estimate the future central place of the novice user, the "daytime central place", "daytime degree of variation", "daytime usage count", "overall central place", "overall degree of variation", "overall usage count", "user attribute", and "location attribute" of the novice user are input to the learning model M1. The inputs to the learning model M1 are information indicating features of the novice user. The learning model M1 outputs the future central place of the novice user based on those inputs.

As described above, the estimation system S increases an estimation accuracy regarding the locations that are likely to be visited by a novice user in the future by using the learning model M1 which has learned a relationship between a degree of variation in the distance from the central place of the locations visited when a veteran user was a novice user to each of those locations and the central place after the veteran user has accumulated a sufficient usage track record. The details of this technology are described below.

[1-3. Functions Implemented by Estimation System of First Embodiment]

Figure 6:
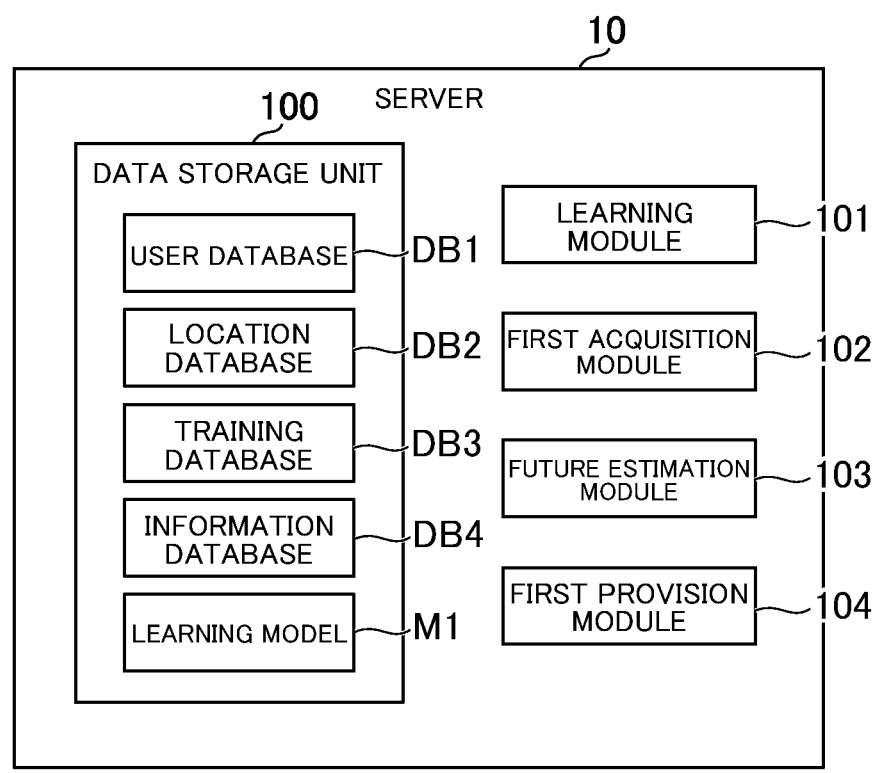
FIG. 6 is a functional block diagram for illustrating an example of functions implemented by an estimation system according to the first embodiment.

FIG. 6 is a functional block diagram for illustrating an example of functions implemented by the estimation system S according to the first embodiment. In the first embodiment, a case in which the main functions are implemented by the server 10 is described. As illustrated in FIG. 6, a data storage unit 100, a learning module 101, a first acquisition module 102, a future estimation module 103, and a first provision module 104 are implemented by the server 10. The data storage unit 100 is mainly implemented by the storage unit 12. Each of the other functions is mainly implemented by the control unit 11.

[Data Storage Unit]

The data storage unit 100 stores the data required to estimate the future central place of a novice user. For example, the data storage unit 100 stores a user database DB1, a location database DB2, a training database DB3, an information database DB4, and the learning model M1.

FIG. 7 is a table for showing a data storage example of the user database DB1. As shown in FIG. 7, the user database DB1 is a database in which information relating to each of a plurality of users is stored. For example, the user database DB1 stores a user ID, a full name, history information, a user attribute, and a central place. When a user has completed the use registration, a new record is created in the user database DB1, and information relating to the user is stored. The date and time at which the user performed use registration may also be stored in the user database DB1.

The history information is information on the usage track record of the communication service. The history information indicates when and which location each user visited and used the communication service. For example, the history information includes the position of the locations visited by each user, the location attribute of those locations, and the date and time when the user visited the locations. The history information may include other information, for example, a payment amount for a location in which payment has occurred, or other information such as how long the user stayed or the good purchased at the location may be included. When there is a lot of history information relating to the user, this means that the user has a large usage track record.

The positions of the locations visited by the user are indicated by the latitude and longitude, coordinates, or address of the location. In the first embodiment, the user moves to the communicable range R of a wireless communication device 20 and uses the communication service, and therefore the location in which the wireless communication device 20 is arranged corresponds to the location visited by the user. Accordingly, the location in which the wireless communication device 20 is arranged as used in the first embodiment can be read as "location visited by the user." The position of each location included in the history information may be the current position detected by the communication unit 33 or the GPS reception unit 36 of the user terminal 30 when the user visited the location.

In the first embodiment, when a certain user moves to the communicable range R of a wireless communication device 20 and uses the communication service, the server 10 creates history information including the position of the location in which the wireless communication device 20 is arranged, the location attribute of the location, and the date and time at that point in time, and stores the created history information in a record corresponding to the user. The position of the location in which the wireless communication device 20 is arranged and the location attribute of the location are stored in the location database DB2.

For example, when the user connects the user terminal 30 to a wireless communication device 20 arranged in a certain convenience store, the position of the convenience store, the location attribute indicating "convenience store," and the date and time at that point in time are included in the history information. Further, for example, when the user connects the user terminal 30 to a wireless communication device 20 arranged in a certain train station, the position of the train station, the location attribute indicating "train station," and the date and time at that point in time are included in the history information.

The user attribute stored in the user database DB1 may be input at the time of use registration, or may be dynamically determined based on the history information. For example, for a static user attribute such as the age or residence of the user, the user attribute is input at the time of use registration. Further, for example, for a user attribute such as a preference or behavior pattern of the user, the user attribute is dynamically determined based on the history information. Moreover, for example, the current position of the user, an IP address of the user terminal 30, and a past payment amount by the user may be stored as the user attribute.

The central place stored in the user database DB1 is a central place estimated by using the learning model M1 or a central place calculated based on the history information. In the record of a novice user, a central place estimated by using the learning model M1 is stored. In the record of a veteran user, a central place calculated based on the history information is stored. A central place for each time period, for example, morning, daytime, and nighttime, may be stored, or a central place for each day, for example, day of the week, weekday, and holiday, may be stored. In addition, for example, a central place for each location attribute may be stored.

FIG. 8 is a table for showing a data storage example of the location database DB2. As shown in FIG. 8, the location database DB2 is a database in which information relating to each of the plurality of locations is stored. For example, the location database DB2 stores the device ID of each wireless communication device 20, the position of the location in which the wireless communication device 20 is arranged, and the location attribute of the location. The content of the location database DB2 is specified by the administrator of the estimation system S.

FIG. 9 is a table for showing a data storage example of the training database DB3. As shown in FIG. 9, the training database DB3 is a database in which training data to be learned by the learning model M1 is stored. In the first embodiment, a pair of the input to the learning model M1 and the output that becomes the correct answer are described as "training data" (teacher data). The training database DB3 stores a collection of such pairs. The details of the training data are as described with reference to FIG. 5. In the first embodiment, a case in which the training data is created by the learning module 101 is described, but the administrator may manually create the training data.

FIG. 10 is a table for showing a data storage example of the information database DB4. As shown in FIG. 10, the information database DB4 is a database in which information to be provided to each of a plurality of users is stored. For example, the information database DB4 stores the position of each of a plurality of locations and information on the locations. The locations may be a location in which the wireless communication device 20 is arranged, or a location in which the wireless communication device 20 is not in particular arranged. For example, the information database DB4 may store information on locations in which another service affiliated with the communication service is provided.

The data storage unit 100 stores the program and parameters of the learning model M1 that has finished learning. The learning model M1 is a model which uses supervised machine learning, and may also be referred to as "artificial intelligence." The machine learning itself can use various methods, for example, a convolutional neural network or a recursive neural network. In a broad sense, deep learning and reinforcement learning are also classified as machine learning, and the learning model M1 may be a model created by using deep learning or reinforcement learning.

The data storage unit 100 in the first embodiment stores a learning model M1 which has learned a relationship between first position information based on the position of a first location, which is a location visited by a veteran user in the past, and second position information based on the position of a second location, which is a location visited by the veteran user after the veteran user visited the first location. The veteran user visits each of the first and second locations and uses the communication service.

The veteran user is an example of a first user. Accordingly, "veteran user" as used herein can be read as "first user." The first user is a user for creating training data. The first user is a user who knows a result that becomes the correct answer. In the first embodiment, a case in which the first user has more of a usage track record than a second user, which is described later, is described. The first user may be any user different from the second user, and may be, for example, a user having a usage track record similar to the second user, or a user having less of a usage track record than the second user.

The first location is a location visited by a veteran user in a part of past periods. Those periods do not include the current point in time. In the first embodiment, the first location is a location visited in a first period immediately after the first user started using the service. For example, the period in which the veteran user was a novice user corresponds to the first period. The first period is not required to be a period such as when the veteran user was a novice user, and may include a part of a period in which a certain amount of usage track record has been accumulated.

The first period may be a fixed length or a length corresponding to the veteran user. For example, a period from the time when the veteran user performed the use registration until a certain time later, or a period from the time when the veteran user performed the use registration until the usage count reached a predetermined count corresponds to the first period. The first period may be any length, for example, a period of about one day to several months, or a period until a usage count reaches about three times to about ten times. In the first embodiment, "when the veteran user was a novice user" means this period.

The first position information is information acquired based on the position of the first location. In the first embodiment, a case in which the first position information is information acquired based on the position of each of a plurality of first locations is described, but the first position information may be information acquired based on the position of only one first location. The first position information may indicate a certain pinpoint position or may indicate a region having a certain size. The first position information may be any information which can identify a position. In the first embodiment, the central place at the time when the veteran user was a novice user corresponds to the first position information. The first position information is not limited to the example of the first embodiment, and the first position information may include, for example, the position of each of the plurality of first locations visited when the veteran user was a novice user. That is, the positions from which the central place is calculated may correspond to the first position information.

The second location is, of the locations visited by a veteran user in the past, a location visited after the first location. In the first embodiment, the second location is a location visited by the first user in a second period after the first period. The second period may include the current point in time or may include a point in time in the past most recently used by the veteran user. It is only required that the second period be closer to the current point in time than the first period. In the first embodiment, a period after the veteran user is no longer a novice user, that is, after a sufficient usage track record has been accumulated, corresponds to the second period.

The second position information is information acquired based on the position of the second location. In the first embodiment, a case in which the second position information is information acquired based on the position of each of a plurality of second locations is described, but the second position information may be information acquired based on the position of one second location. In the first embodiment, a case in which the second position information is acquired based on both of the position of the first location and the position of the second location is described, but the second position information may be acquired based on only the position of the second location. The second position information may indicate a certain pinpoint position or may indicate a region having a certain size. The second position information may be any information which can identify a position. In the first embodiment, the central place after the veteran user was no longer a novice user corresponds to the second position information. The second position information is not limited to the example of the first embodiment, and the second position information may include, for example, the position of each of the plurality of second locations visited after the veteran user was no longer a novice user. That is, the positions from which the central place is calculated may correspond to the second position information.

The data stored in the data storage unit 100 is not limited to the example described above. For example, the data storage unit 100 may store the learning model M1 before the training data is learned and the program required for learning the training data.

[Learning Module]

The learning module 101 causes the learning model M1 to learn the training data stored in the training database DB3. As the learning method of the learning model M1 itself, various methods can be used, for example, gradient descent or backpropagation. As described above, deep learning or reinforcement learning method may also be used. The learning module 101 adjusts the parameters of the learning model M1 so that, when the input portion of the training data is input, the output portion of the training data is output.

In the first embodiment, the first position information includes a first central place, which is a central place based on a plurality of first locations visited by a veteran user in the past. The second position information includes a second central place, which is a central place based on a plurality of second locations visited by the veteran user after the plurality of first locations. In the learning model M1, a relationship between the first central place of a certain veteran user and the second central place of the veteran user is learned. The first central place may be calculated internally in the learning model M1. In this case, each position required to calculate the first central place may be input to the learning model M1.

The learning module 101 identifies a plurality of first locations visited when the veteran user was a novice user based on the history information on the veteran user stored in the user database DB1. The learning module 101 identifies locations having a usage date and time in the history information which is included in the first period as the first locations. The learning module 101 calculates the average of the positions of the identified plurality of first locations, and acquires the calculated average as the first central place.

The first central place may be a simple average of the positions of the plurality of first locations, or may be a weighted average calculated by using a weighting factor corresponding to the date and time at which the veteran user visited. In the case of a weighted average, a larger weighting factor may be used as the date and time becomes closer to the current point in time. The first central place may be calculated for each region having a certain size. Through calculation of the first central place for each region, it becomes possible to calculate the central place of the veteran user for each region, such as a central place near the home of the veteran user or a central place near the workplace of the veteran user.

The learning module 101 identifies a plurality of second locations visited after the veteran user is no longer a novice user based on the history information on the veteran user stored in the user database DB1. In the first embodiment, a case in which all periods are considered in the calculation of the second central place is described, and therefore the learning module 101 calculates the average of the positions of each of the plurality of first locations and second locations visited by the veteran user over all the periods, and acquires the calculated average as the second central place. Like the first central place, the second central place may be a simple average or a weighted average.

The learning module 101 creates training data including the first central place of a certain veteran user and the second central place of the veteran user. The learning module 101 creates training data for each of a plurality of veteran users, and stores the created training data in the training database DB3. The learning module 101 adjusts the parameters of the learning model M1 based on the training data so that, when the first central place of a certain veteran user is input, the second central place of the veteran user is output.

In the first embodiment, the first position information further includes a first degree of variation, which is the degree of variation in the distance between the first central place and the position of each of the plurality of first locations. In the learning model M1, a relationship between the first central place and the first degree of variation of a certain veteran user, and the second central place of the veteran user is learned. The first degree of variation may be calculated internally in the learning model M1. In this case, each position required to calculate the first degree of variation may be input to the learning model M1.

The learning module 101 calculates the distance between the first central place and the position of each of the plurality of first locations visited when the veteran user was a novice user. The learning module 101 then calculates the degree of variation in the distance calculated for each first location, and acquires the calculated degree of variation as the first degree of variation. The degree of variation can be represented by any indicator, for example, standard deviation, variance, or covariance. The calculation formula itself for calculating the indicator may be a known formula. The degree of variation can also be referred to as "degree of scattering" or "degree of closeness."

The learning module 101 creates training data including the first central place and the first degree of variation of a certain veteran user, and the second central place of the veteran user. The learning module 101 creates training data for each of a plurality of veteran users, and stores the created training data in the training database DB3. The learning module 101 adjusts the parameters of the learning model M1 based on the training data so that, when the first central place and the first degree of variation of a certain veteran user are input, the second central place of the veteran user is output.

In the first embodiment, the learning model M1 is created based on first feature information relating to a veteran user, which is different from the first position information. The first feature information is information on a feature of a veteran user. In the sense of being a feature of a location visited by a veteran user, the first position information also indicates some kind of feature, but the first feature information is information indicating a feature other than a location visited by a veteran user. Specific examples of the first feature information are described later, but in addition to the examples described later, information on the gender, occupation, annual income, past usage amount of money, or usage status of another service of the veteran user may correspond to the first feature information.

In the first embodiment, a case in which the training data includes the first feature information on a veteran user and is used in the learning by the learning model M1 is described. Accordingly, the first feature information on a veteran user being learned by the learning model M1 means that the learning model M1 is created based on the first feature information. In the first embodiment, of the training data shown in FIG. 9, information other than information on the central place and the degree of variation corresponds to the first feature information.

A separate learning model M1 may be prepared for each feature indicated by the first feature information. For example, a separate learning model M1 may be prepared for each feature, such as the age, gender, residence, or usage count of the veteran user. Accordingly, preparing a separate learning model M1 for each feature indicated by the first feature information on the veteran user may mean that learning models M1 are created based on the first feature information.

As another example, a separate learning model M1 may be prepared for each location attribute. For example, a dedicated learning model M1 may be prepared for each location attribute, such as a learning model M1 for a convenience store, a learning model M1 for a train station, and a learning model M1 for a supermarket. Thus, preparing a separate learning model M1 for each location attribute may mean that learning models M1 are created based on the first feature information.

When a separate learning model M1 is prepared for each location attribute, the central place and the degree of variation may be calculated based on the position of the location of the relevant location attribute. That is, the positions of the locations of other location attributes are not referenced in the calculation of the central place and the degree of variation, or the weighting is reduced when the central place and the degree of variation are calculated. For example, in the case of a learning model M1 for a convenience store, the central place and the degree of variation are calculated based on the position of the location of the location attribute of the "convenience store." The same applies to the other location attributes. The same also applies to the central place and the degree of variation of the novice user to be input to the learning model M1 that has finished learning, and the central place and the degree of variation are calculated based on the position of the location of the location attribute corresponding to the learning model M1.

In the first embodiment, the first feature information includes a first usage count, which is the number of times the service has been used by the veteran user. The learning model M1 may be created based on the first usage count. The learning module 101 counts, based on the user database DB1, the usage count when the veteran user was a novice user, and acquires the counted usage count as the first usage count. The learning module 101 creates training data including the first usage count of a certain veteran user. The learning module 101 adjusts the parameters of the learning model M1 so that, when the first usage count of a certain veteran user is input together with another feature such as the first central place, the second central place of the veteran user is output.

In the first embodiment, the first feature information includes the first usage count for a predetermined period. The learning model M1 may be created based on the first usage count for the predetermined period. The predetermined period is a partial period of the first period. In the first embodiment, a learning model M1 for daytime is created, and therefore a time period in the daytime corresponds to the predetermined period. The predetermined period may be another period, for example, morning or nighttime, or may be a weekday, a holiday, or a day of the week. The predetermined period may be defined as a season, or as a unique period not particularly classified in the manner described above.

The learning module 101 counts, based on the user database DB1, a usage count for the daytime when the veteran user was a novice user, and acquires the counted usage count as a first usage count for the daytime. The learning module 101 creates training data including the first usage count for the daytime of a certain veteran user. The learning module 101 adjusts the parameters of the learning model M1 so that, when the first usage count for the daytime of a certain veteran user is input together with another feature such as the first central place, the second central place of the veteran user is output.

In the first embodiment, the first feature information includes a user attribute, which is an attribute of a veteran user. The learning model M1 may be created based on the user attribute. The learning module 101 acquires the user attribute of the veteran user based on the user database DB1. The learning module 101 creates training data including the user attribute of the veteran user. The learning module 101 adjusts the parameters of the learning model M1 so that, when the user attribute of a certain veteran user is input together with another feature such as the first central place, the second central place of the veteran user is output.

In the first embodiment, the first feature information includes a first location attribute, which is an attribute of the first location. The learning model M1 may be created based on the first location attribute. The learning module 101 acquires the first location attribute based on the location database DB2. The learning module 101 creates the training data based on the first location attribute of the first location visited by a certain veteran user. The learning module 101 adjusts the parameters of the learning model M1 so that, when the first location attribute of the first location visited by a certain veteran user is input together with another feature such as the first central place, the second central place of the veteran user is output.

In the first embodiment, the first feature information includes a second location attribute, which is an attribute of the second location. The learning model M1 may be created based on the second location attribute. The learning module 101 acquires the second location attribute based on the location database DB2. The learning module 101 creates the training data based on the second location attribute of the second location visited by a certain veteran user. For example, the learning module 101 creates the training data based on the second location of the same second location attribute as the first location attribute of the first location visited by a certain veteran user. The learning module 101 adjusts the parameters of the learning model M1 so that, when the input portion of the training data created based on the second location attribute is input, the output portion of the training data is output. This point is as described in the example described by using the location attribute of the "convenience store." For example, when it is desired to provide information on the location attribute of the "convenience store," the training data may be created and the learning model M1 may be learned based on the location of the "convenience store" visited by the veteran user in the past. In this case, the input to the learning model M1 that has finished learning may be created based on the location of the "convenience store" visited by the novice user in the past.

In the first embodiment, the learning model M1 may be created based on first position information which is based on a position of a first location visited by the veteran user in a predetermined period in the past. The meaning of the predetermined period is as described above. For example, the learning module 101 acquires, based on the user database DB1, first position information based on the position of a first location visited in the daytime when the veteran user was a novice user. The learning module 101 creates training data including the first position information, and adjusts the parameters of the learning model M1.

[First Acquisition Module]

The first acquisition module 102 acquires third position information which is based on the position of a third location, which is a location visited by a novice user in the past. The novice user is an example of the second user. Accordingly, the "novice user" as used herein can be read as "second user." The second user is the user for which a central place is to be estimated. In the first embodiment, a case in which the second user is a user who visits a third location, uses the service, and has a lower usage count of the service than the first user is described. It is only required that the second user be a user different from the first user.

The third location is a location visited by the novice user in all or a part of the periods in the past. The length of this period may be different from the length of the first period described above. The third position information is information acquired based on the position of the third location. In the first embodiment, a case in which the third position information is information acquired based on the position of each of a plurality of third locations is described, but the third position information may be information acquired based on the position of one third location. The third position information may indicate a certain pinpoint position or may indicate a region having a certain size. The third position information may be any information which can identify a position.

In the first embodiment, the third position information includes a third central place, which is a central place based on a plurality of third locations visited by the novice user in the past. The third position information is not limited to the example of the first embodiment, and for example, the third position information may include each position of a plurality of third locations visited by the novice user. That is, the positions from which the central place is calculated may correspond to the third position information.

The first acquisition module 102 identifies a plurality of third locations visited by the novice user based on the history information on the novice user stored in the user database DB1. The first acquisition module 102 calculates the average of the positions of the identified plurality of third locations, and acquires the calculated average as the third central place. Like the first central place and the second central place, the third central place may be a simple average or a weighted average.

In the first embodiment, the third position information further includes a second degree of variation, which is the degree of variation in the distance between the third central place and the position of each of the plurality of third locations. The first acquisition module 102 calculates the distance between the third central place and the position of each of the plurality of third locations visited by the novice user. The first acquisition module 102 calculates the degree of variation in the distance calculated for each third location, and acquires the calculated degree of variation as the second degree of variation. The second degree of variation, like the first degree of variation, can be represented by any indicator, and can be calculated based on a calculation formula corresponding to each indicator.

In the first embodiment, the first acquisition module 102 acquires the third position information which is based on the position of a third location visited by the novice user in a predetermined period in the past. The meaning of the predetermined period is as described above. For example, the first acquisition module 102 acquires, based on the user database DB1, third position information based on the position of a third location visited in the daytime by the novice user. The point that the predetermined period is not limited to a time period in the daytime is also as described above.

[Future Estimation Module]

The future estimation module 103 acquires the output of the learning model M1 corresponding to the third position information as an estimation result of fourth position information which is based on the position of a fourth location, which is a location that is likely to be visited by the novice user in the future.

The fourth location is a location that is estimated to be visited by the novice user in the future. The fourth position information is information acquired based on the output of the learning model M1. In the first embodiment, there is described a case in which the output of the learning model M1 corresponds to the fourth position information as it is, but information obtained by performing some kind of processing on the output of the learning model M1 may correspond to the fourth position information. The fourth position information may indicate a certain pinpoint position or may indicate a region having a certain size. The fourth position information may be any information that can identify some kind of position. The fourth position information may include a plurality of positions. For example, the fourth position information may include the position of each of a plurality of fourth locations that are likely to be visited by the novice user.

In the first embodiment, the fourth position information includes a fourth central place, which is a central place based on a plurality of fourth locations that are likely to be visited by the novice user in the future. The future estimation module 103 acquires the output of the learning model M1 corresponding to the third central place as an estimation result of the fourth central place of the novice user.

In the first embodiment, the third central place and the second degree of variation are input to the learning model M1, and the future estimation module 103 acquires the output of the learning model M1 corresponding to the third central place and the second degree of variation as the estimation result of the fourth central place of the novice user. The learning model M1 acquires the third central place and the second degree of variation as one of the features of the novice user, and outputs an estimation result of the fourth central place corresponding to that feature.

Further, in the first embodiment, first feature information on the veteran user is learned by the learning model M1, and therefore the future estimation module 103 acquires an estimation result of the fourth position information based on the second feature information relating to the novice user, which is different from the third position information. The learning model M1 acquires the second feature information as one of the features of the novice user, and outputs an estimation result of the fourth central place corresponding to that feature.

In the first embodiment, the second feature information includes a second usage count, which is the number of times the service has been used by the novice user. The future estimation module 103 acquires an estimation result of the fourth position information based on the second usage count. The learning model M1 acquires the second usage count as one of the features of the novice user, and outputs an estimation result of the fourth central place corresponding to that feature.

In the first embodiment, the second feature information includes a second usage count for a predetermined period. The future estimation module 103 acquires an estimation result of the fourth position information based on the second usage count for the predetermined period. The learning model M1 acquires the second usage count, which is the daytime usage count of the novice user, as one of the features of the novice user, and outputs the estimation result of the fourth central place corresponding to that feature.

In the first embodiment, the second feature information includes a novice user attribute, which is an attribute of a novice user. The future estimation module 103 acquires an estimation result of the fourth position information based on the novice user attribute. The learning model M1 acquires the novice user attribute as one of the features of the novice user, and outputs an estimation result of the fourth central place corresponding to that feature. When a learning model M1 is prepared for each user attribute, the information on the third central place of the novice user and the like may be input to the learning model M1 corresponding to the novice user attribute.

In the first embodiment, the second feature information includes a third location attribute, which is an attribute of a third location. The future estimation module 103 acquires an estimation result of the fourth position information based on the third location attribute. The learning model M1 acquires the third location attribute as one of the features of the novice user, and outputs an estimation result of the fourth central place corresponding to that feature. When a learning model M1 is prepared for each location attribute, information on the third central place or the like may be input to the learning model M1 corresponding to the location attribute of the location used to calculate the third central place or the like.

In the first embodiment, the future estimation module 103 acquires an estimation result of the fourth position information which is based on the position of a fourth location that is likely to be visited in a predetermined period in the future. The learning model M1 outputs the estimation result of the fourth position information which is based on the position of the fourth location that is likely to be visited by the novice user in the daytime in the future. In the first embodiment, the future estimation module 103 acquires the output of the learning model M1 as an estimation result of the fourth position information on the novice user having a lower usage count of the service than the first user.

[First Provision Module]

The first provision module 104 provides information determined based on the fourth position information to the novice user. For example, the first provision module 104 provides, based on the information database DB4, information associated with a location within a predetermined distance from the position indicated by the fourth position information to the novice user. The predetermined distance may be any length, may be a fixed value, or may be a variable value. The length of the predetermined distance may be different depending on the area of the position indicated by the fourth position information. For example, in the case of a provincial area, the predetermined distance may be longer than in the case of an urban area. When the fourth position information is a region having a certain size, information on the locations in this region may be provided.

[1-4. Processing to be Executed by Estimation System of First Embodiment]

Next, an example of processing to be executed by the estimation system of the first embodiment is described. In the first embodiment, learning processing for causing the learning model M1 to learn the trends of veteran users and estimation processing for estimating a future central place of a novice user are described. The learning processing and the estimation processing are each executed by the control unit 11 operating in accordance with the programs stored in the storage unit 12. The learning processing and the estimation processing are each an example of processing to be executed by the functional blocks illustrated in FIG. 6.

[Learning Processing]

Figure 11:
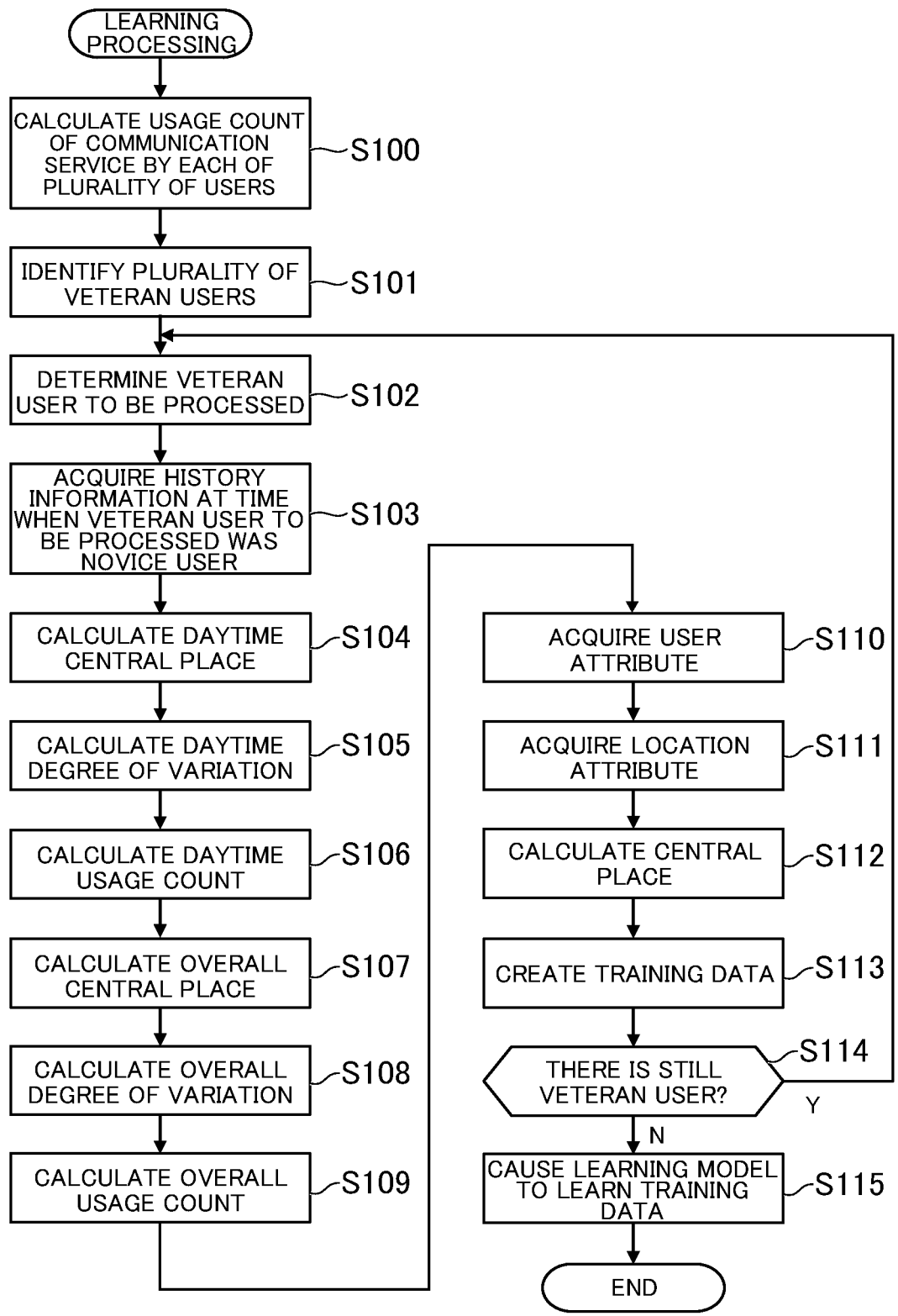
FIG. 11 is a flow chart for illustrating an example of learning processing.

FIG. 11 is a flow chart for illustrating an example of learning processing. As illustrated in FIG. 11, the server 10 calculates the usage count of the communication service by each of a plurality of users based on the user database DB1 (Step S100). In Step S100, the usage count of all the users is calculated, but the usage count of only a part of the users may be calculated. Further, the usage count for all periods is calculated, but the usage count for only a part of the periods may be calculated. In the first embodiment, history information is accumulated every time the communication service is used by a user, and therefore the number of pieces of history information is acquired as the usage count.

The server 10 identifies a plurality of veteran users based on the usage count of the communication service (Step S101). The server 10 identifies, as veteran users, a plurality of users having a usage count that is equal to or larger than a threshold value. In Step S101, the threshold value for identifying veteran users is assumed to be a fixed value, but the threshold value may be a variable value. In Step S101, instead of using a threshold value, a predetermined number of users in descending order of the usage count, or a predetermined ratio of a plurality of users may be identified as the plurality of veteran users.

The server 10 determines the veteran user for which the processing steps of from Step S103 to Step S113 are to be executed from among the plurality of veteran users identified in Step S101 (Step S102). In Step S102, the server 10 determines, from among the plurality of veteran users identified in Step S101, any one of the veteran users from which training data has not yet been created, as the veteran user to be processed.

The server 10 acquires the history information at the time when the veteran user was a novice user from among the pieces of history information on the veteran user to be processed (Step S103). In Step S103, the server 10 acquires a predetermined number of pieces of history information in order from the oldest usage date and time included in the history information on the veteran user to be processed. Instead of acquiring a predetermined number of pieces of history information, the server 10 may acquire the history information within a fixed period of time after the veteran user to be processed performed the use registration.

The server 10 calculates the daytime central place at the time when the veteran user to be processed was a novice user based on the history information acquired in Step S103 (Step S104). In Step S104, the server 10 calculates the average of the usage positions having a time period in the daytime as the usage date and time included in the history information acquired in Step S103, and acquires the calculated average of the usage positions as the daytime central place.

The server 10 calculates the daytime degree of variation at the time when the veteran user to be processed was a novice user based on the history information acquired in Step S103 (Step S105). In Step S105, the server 10 calculates, for each usage position having a time period in the daytime as the usage date and time included in the history information acquired in Step S103, the distance between the usage position and the daytime central place calculated in Step S104. The server 10 calculates the standard deviation, for example, of the calculated distance, and acquires the calculated standard deviation, for example, as the degree of variation.

The server 10 calculates the daytime usage count at the time when the veteran user to be processed was a novice user based on the history information acquired in Step S103 (Step S106). In Step S106, the server 10 counts, of the pieces of history information acquired in Step S103, the number of pieces of history information having a time period in the daytime as the usage date and time, and acquires the counted number of pieces of history information as the daytime usage count.

The server 10 calculates the overall central place at the time when the veteran user to be processed was a novice user based on the history information acquired in Step S103 (Step S107). The calculation method to be used in Step S107 is similar to that used in Step S104, but is different in terms of the point that the calculation is performed by using not only the history information having a time period in the daytime as the usage date and time included in the history information, but also using the history information on all of the time periods at the time when the veteran user to be processed was a novice user. In this regard, the processing steps of Step S108 and Step S109 are also the same.

The server 10 calculates the overall degree of variation at the time when the veteran user to be processed was a novice user based on the history information acquired in Step S103 (Step S108). The server 10 calculates the overall usage count at the time when the veteran user to be processed was a novice user based on the history information acquired in Step S103 (Step S109).

The server 10 acquires the user attribute of the veteran user to be processed based on the user database DB1 (Step S110). The server 10 acquires the location attribute of a location visited when the veteran user was a novice user based on the history information acquired in Step S103 (Step S111). In Step S111, the location attribute of the most visited location is acquired.

The server 10 calculates, based on the history information for all periods on the veteran user to be processed, the central place after the veteran user is no longer a novice user, that is, after a sufficient usage track record has been accumulated (Step S112). The calculation method to be used in Step S112 is similar to that used in Step S104 and Step S107, but is different in terms of the point that the calculation is performed by using not only the history information at the time when the veteran user was a novice user, but also using the history information for all periods on the user. The calculation may be performed by using the history information for only a part of the periods instead of for all of the periods.

The server 10 creates, as training data corresponding to the veteran user to be processed, a pair of the pieces of information acquired in Step S104 to Step S111 and the central place that becomes the correct answer calculated in Step S112, and stores the created pairs in the training database DB3 (Step S113).

The server 10 determines whether or not there is a veteran user for which training data has not yet been created (Step S114). When it is determined that there is a veteran user for which training data has not yet been created (Y in Step S114), the process returns to Step S102. In this case, the next veteran user for which training data is to be created is determined, the processing steps of from Step S103 to Step S113 are executed for that veteran user, and training data corresponding to the veteran user is created.

When it is not determined that there is a veteran user for which training data has not yet been created (N in Step S114), the server 10 causes the learning model M1 to learn each piece of training data stored in the training database DB3 (Step S115), and this process ends. In Step S115, the parameters of the learning model M1 are adjusted so that a relationship between the input and the output which are included in each piece of training data is obtained.

[Estimation Processing]

Figure 12:
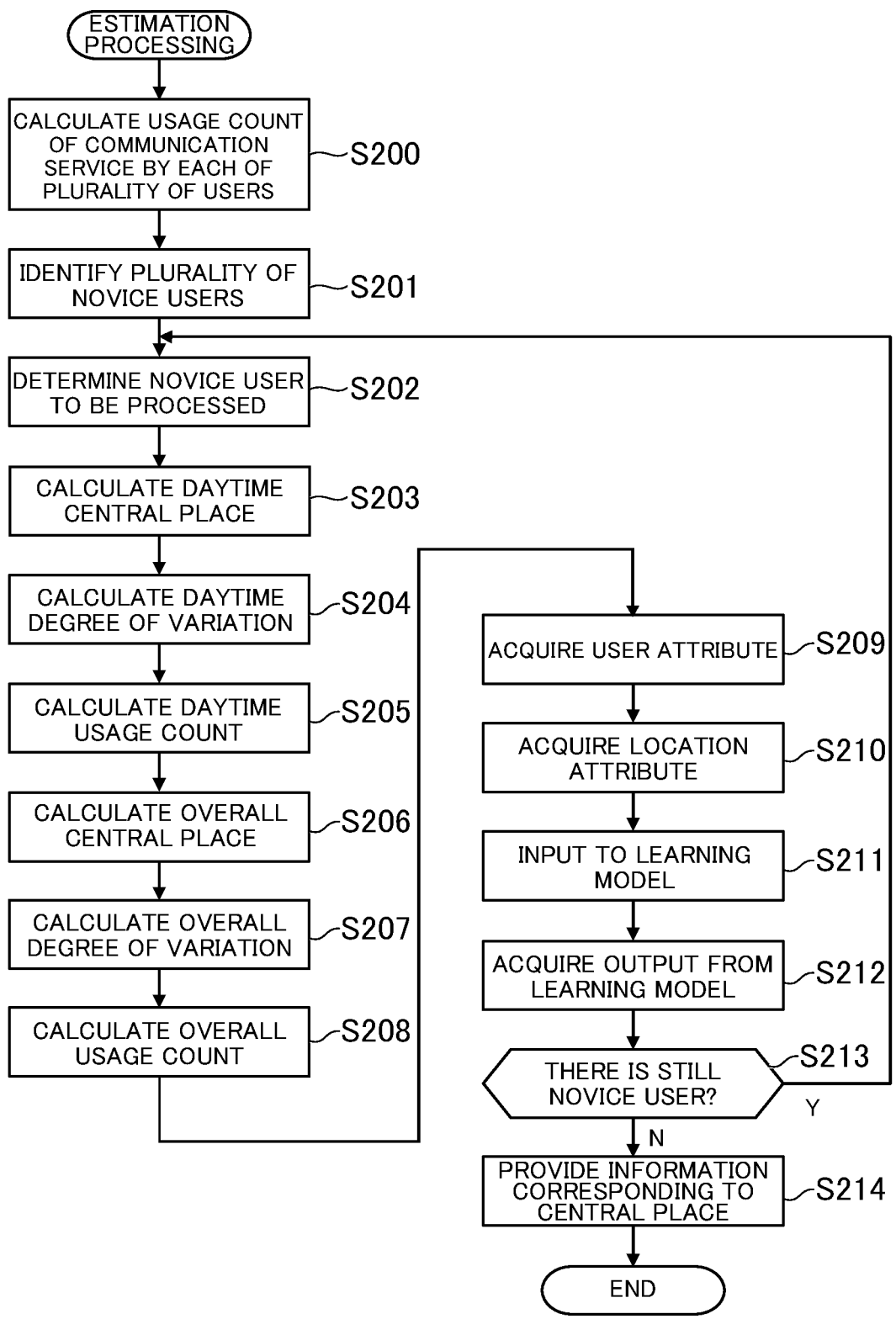
FIG. 12 is a flow chart for illustrating an example of estimation processing.

FIG. 12 is a flow chart for illustrating an example of estimation processing. As illustrated in FIG. 12, the server 10 calculates the usage count of the communication service by each of a plurality of users based on the user database DB1 (Step S200). The processing step of Step S200 is the same as the processing step of Step S100.

The server 10 identifies a plurality of novice users based on the usage count of the communication service (Step S201). The processing step of Step S201 is similar to the processing step of Step S101, but is different from the processing step of Step S101 in that instead of identifying a plurality of users having a usage count equal to or larger than a threshold value, a plurality of users having a usage count less than a threshold value are identified.

The server 10 determines the novice user for which the processing steps of from Step S203 to Step S212 are to be executed from among the plurality of novice users identified in Step S201 (Step S202). In Step S202, the server 10 determines, from among the plurality of novice users identified in Step S201, any one of the novice users from which the central place has not yet been estimated, as the novice user to be processed.

The server 10 calculates, based on the history information on the novice user to be processed, the daytime central place of the novice user (Step S203). In Step S203, the server 10 calculates the average of the usage positions having a time period in the daytime as the usage date and time included in the history information on the novice user to be processed, and acquires the calculated average of the usage positions as the daytime central place.

The server 10 calculates, based on the history information on the novice user to be processed, the daytime degree of variation of the novice user (Step S204). In Step S204, the server 10 calculates, for each usage position having a time period in the daytime as the usage date and time included in the history information on the novice user to be processed, the distance between the usage position and the daytime central place calculated in Step S203. The server 10 calculates the standard deviation, for example, of the calculated distance, and acquires the calculated standard deviation, for example, as the degree of variation.

The server 10 calculates, based on the history information on the novice user to be processed, the daytime usage count of the novice user (Step S205). In Step S205, the server 10 counts, of the pieces of history information on the novice user to be processed, the number of pieces of history information having a time period in the daytime as the usage date and time, and acquires the counted number of pieces of history information as the daytime usage count.

The server 10 calculates, based on the history information on the novice user to be processed, the overall central place of the novice user (Step S206). The calculation method to be used in Step S206 is similar to that used in Step S203, but is different in terms of the point that the calculation is performed by using not only the history information having a time period in the daytime as the usage date and time included in the history information, but also using the history information on all of the time periods of the novice user. In this regard, the processing steps of Step S207 and Step S208 are also the same.

The server 10 calculates, based on the history information on the novice user to be processed, the overall degree of variation of the novice user (Step S207). The server 10 calculates, based on the history information on the novice user to be processed, the overall usage count of the novice user (Step S208).

The server 10 acquires the user attribute of the novice user to be processed based on the user database DB1 (Step S209). The server 10 acquires, based on the history information on the novice user to be processed, the location attribute of a location visited by the novice user (Step S210).

The server 10 inputs the pieces of information acquired in Step S203 to Step S210 to the learning model M1 (Step S211), acquires the output from the learning model M1 as the future central place of the novice user to be processed, and stores the acquired output in the user database DB1 (Step S212).

The server 10 determines whether or not there is a novice user for which a central place has not yet been estimated (Step S213). When it is determined that there is a novice user for which a central place has not yet been estimated (Y in Step S213), the process returns to Step S202. In this case, the next novice user for which the central place is to be estimated is then determined, the processing steps of from Step S203 to Step S212 are executed for the novice user, and the future central place of the novice user is estimated.

When it is not determined that there is a novice user for which a central place has not yet been estimated (N in Step S213), the server 10 provides, to each of the plurality of users, information corresponding to the central place of the relevant user based on the user database DB1 and the information database DB4 (Step S214), and this process ends.

According to the estimation system S of the first embodiment, by using the learning model M1 to acquire a fourth central place, which is a future central place of a novice user, the estimation accuracy regarding locations that are likely to be visited by the novice user in the future is increased. The learning model M1 has learned a trend exhibited when a veteran user was a novice user, and the output from the learning model M1 reflects the trend of the veteran user. As a result, the accuracy of the estimation result is increased. Through estimation of the locations that are likely to be visited by the novice user in the future, it is possible to provide information that is useful to the user without being required to acquire the current position of the user in real time, and therefore the power consumption of the user terminal 30 can be reduced and the processing load on the user terminal 30 can be reduced.

Further, in the estimation system S, by causing the learning model M1 to learn a relationship between a first central place of a veteran user and a second central place of the veteran user, and acquiring output of the learning model M1 corresponding to a third central place in the past of a novice user as an estimation result of a future fourth central place of the novice user, the learning model M1 more strongly learns a relationship between the central place at the time when the usage track record of the communication service is insufficient and the central place at the time when the usage track record of the communication service becomes sufficient, and the estimation accuracy of the fourth central place is effectively increased.

Further, in the estimation system S, by causing the learning model M1 to learn a relationship between a first central place and a first degree of variation of a veteran user, and a second central place of the veteran user, and acquiring output of the learning model M1 corresponding to a third central place and a second degree of variation in the past of a novice user as an estimation result of a future fourth central place of the novice user, the learning model M1 has learned a first degree of variation that more strongly influences the future central place, and therefore the estimation accuracy of the fourth central place is effectively increased.

Further, in the estimation system S, by creating a learning model M1 based on first feature information relating to a veteran user, and acquiring an estimation result of the fourth central place based on second feature information relating to a novice user, the learning model M1 has learned information other than the position of the central place, for example, and therefore the estimation accuracy of the fourth central place is effectively increased. For example, when the current central place of the novice user is unreliable, the fourth central place is estimated by emphasizing the trend of a veteran user having similar other features, and therefore even when the current central place of the novice user is unreliable, the fourth central place can be estimated to a certain degree.

Further, in the estimation system S, by creating a learning model M1 based on a first usage count, which is a usage count of the communication service by a veteran user, and acquiring an estimation result of the fourth central place based on a second usage count, which is a usage count of the service by a novice user, the fourth central place is estimated based on a trend of another user having a similar usage count, and therefore the estimation accuracy of the fourth central place is effectively increased. For example, the fourth central place is estimated based on the trend of a veteran user having a similar usage count for a fixed period since the use registration is performed, and therefore even when the current central place of the novice user is unreliable, the fourth central place can be estimated to a certain degree.

Further, in the estimation system S, by creating a learning model M1 based on a first usage count for the daytime, and acquiring an estimation result of the fourth central place based on the second usage count for the daytime, a fourth central place for the daytime can be estimated. As a result, it is possible to estimate a fourth central place corresponding to a time period, and useful information corresponding to the time period can be provided to the user. For example, the fourth central place is estimated based on the trend of a veteran user having a similar daytime usage count for a fixed period since the use registration is performed, and therefore even when the current central place of the novice user is unreliable, the fourth central place can be estimated to a certain degree.

Further, in the estimation system S, by creating a learning model M1 based on a user attribute of a veteran user, and acquiring an estimation result of the fourth central place based on the user attribute of a novice user, the fourth central place is estimated based on a trend of another user having the same user attribute, and therefore the estimation accuracy of the fourth central place is effectively increased. For example, when the current central place of the novice user is unreliable, the fourth central place is estimated by emphasizing the trend of a veteran user having similar user attribute, and therefore, even when the current central place of the novice user is unreliable, the fourth central place can be estimated to a certain degree.

Further, in the estimation system S, by creating a learning model M1 based on a first location attribute, the fourth central place is estimated based on information having the same location attribute, and therefore the estimation accuracy of the fourth central place is effectively increased. For example, for a novice user who visits many locations having the location attribute of "cafe," there is a possibility that the trend of a veteran user who visits many locations having the location attribute of "cafe" is more reliable than the trend of a veteran user who visits many locations having the location attribute of "convenience store," and therefore, by considering the location attribute, the estimation accuracy of the fourth central place is effectively increased.

Further, in the estimation system S, by creating a learning model M1 based on a second location attribute, the learning model M1 has learned the central place of the locations having the same location attribute as those of the locations visited by a veteran user when the veteran user was a novice user, and therefore the estimation accuracy of the fourth central place is effectively increased. For example, when a veteran user frequently visited locations having the location attribute of "convenience store" when the veteran user was a novice user, by calculating the central place based on the locations having the attribute "convenience store" visited after the veteran user was no longer a novice user, the learning model M1 can learn the central place at the time when the veteran user visits a "convenience store." As a result, it is possible to accurately estimate the central place of the "convenience store" that is to be visited by a novice user in the future.

Further, in the estimation system S, by creating a learning model M1 based on first position information which is based on the position of a first location visited by a veteran user in the daytime, and acquiring an estimation result of the fourth central place to be visited in the daytime in the future, a fourth central place corresponding to the time period is estimated, and the estimation accuracy of the fourth central place is effectively increased.

Further, in the estimation system S, by causing the learning model M1 to learn a relationship between the locations visited in a first period immediately after a veteran user started using the service and the locations visited by the veteran user in a second period after the first period, and acquiring the output of the learning model M1 as an estimation result of the fourth central place of a novice user having a smaller usage count than the veteran user, the estimation accuracy of the fourth central place is increased even for a user having an insufficient usage track record.

Further, the estimation system S can also provide useful information to users in advance by providing information determined based on the fourth central place to a novice user. For example, when the current position of a novice user is acquired in real time and information corresponding to the current position is provided, the novice user may not notice the information, but by estimating the future central place of the novice user and providing information corresponding to the central place in advance, it is easier for the novice user to notice the information. In addition, the information is provided based on a fourth central place that is likely to be visited by the user in the future, and therefore information in which the user is more interested can be provided.

2. Second Embodiment

Next, an estimation system S according to a second embodiment of the present disclosure is described. The second embodiment is described by taking a case in which a use attribute (described later in detail), which is an attribute of a location in which a wireless communication device 20 is arranged, is estimated based on the distance between the position of the location and the central place of the user who has visited the location. In the second embodiment, description of the same parts as those of the first embodiment is omitted.

[2-1. Outline of Second Embodiment]

Figure 13:
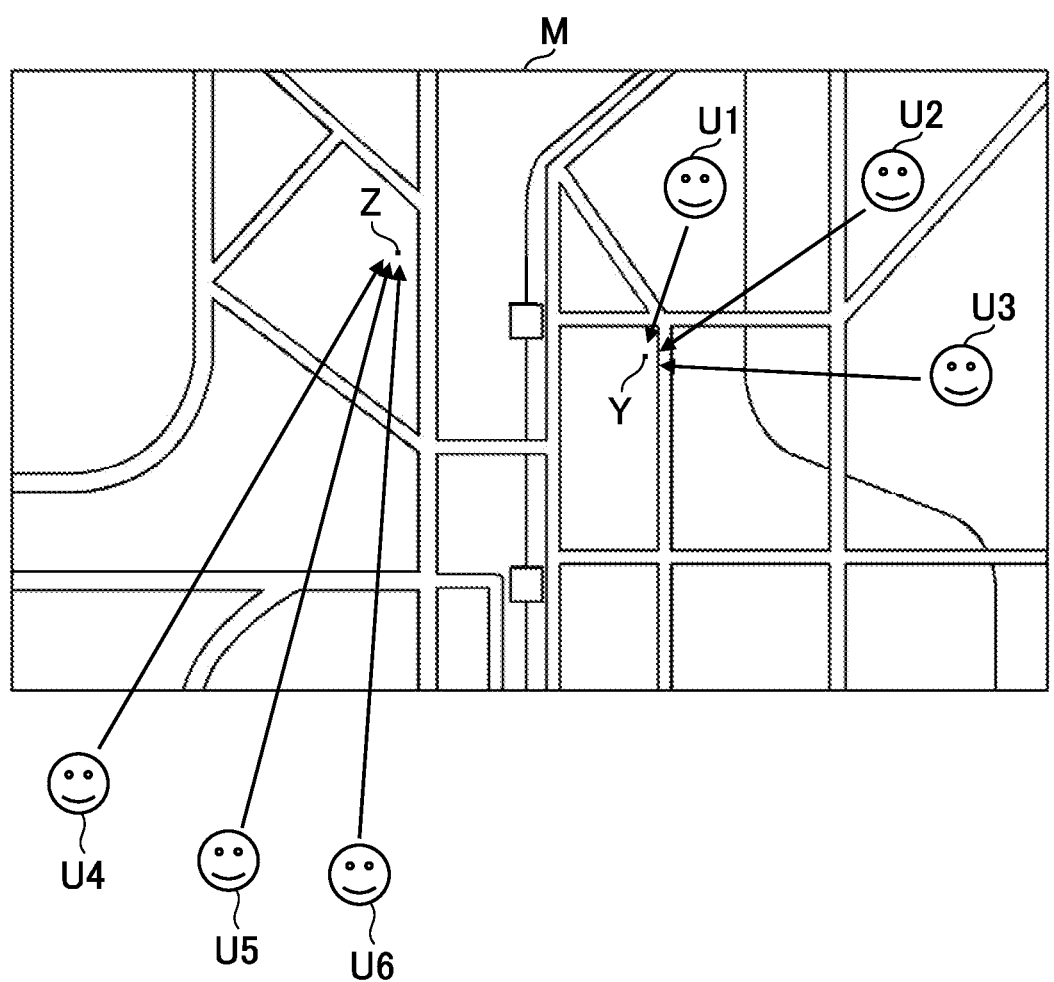
FIG. 13 is a diagram for illustrating an outline of a second embodiment of the present disclosure.

FIG. 13 is a diagram for illustrating an outline of the second embodiment. In FIG. 13, a map M of a resort area X in which there is a ski resort is illustrated. In the map M of FIG. 13, the positions of shops Y and Z, which are convenience stores, are plotted. A wireless communication device 20 is arranged in each of the shops Y and Z. The location attribute of "convenience store" is associated with each of the shops Y and Z, and the shops Y and Z may have about the same distance from the nearest train station.

Various types of users register to use the communication service, and therefore the way in which each of the shops Y and Z, in which a wireless communication device 20 is arranged, is used may be different from each other. For example, when the shop Y is in a residential area, the shop Y may be used mainly by users U1 to U3, who are neighborhood residents. Further, for example, when the shop Z is on a main road, the shop Z may be used mainly by users U4 to U6, who are tourists.

Assuming that all users have registered a correct residence with the communication service, the use of each of the shops Y and Z can be identified based on the residences of the users who have used the wireless communication device 20 in each of the shops Y and Z. For example, when the residence of a user using the wireless communication device 20 in the shop Y is in the vicinity of the resort area X, the shop Y can be identified as a "convenience store" for "neighborhood residents." When the residence of a user using the wireless communication device 20 in the shop Z is an urban area far from the resort area X, the shop Z can be identified as a "convenience store" for "tourists."

Information, such as "for neighborhood residents" and "for tourists", is one type of attribute because the shops Y and Z can be classified based on some sort of perspective. This attribute is an attribute having a perspective different from that of the location attribute of "convenience store" associated with the shops Y and Z. This attribute is information that can classify the use of the shops Y and Z, and therefore this attribute is described in the following description as "use attribute." The use attribute of a certain location can be estimated based on the distance between the position of the location and the positions of the locations that are usually visited by the user who has visited the location.

However, a user may not register his or her correct residence with the communication service. Users often register their old pre-moving residence with the communication service. In this case, the correct use attribute cannot be estimated. There are also users who do not register their residence with the communication service, and there are also communication services that do not require a residence to be registered. In this case, it is not possible to even estimate a use attribute through use of the residence.

To deal with this problem, in the estimation system S of the second embodiment, the use attribute of a certain wireless communication device 20 is accurately estimated based on the distance between the position of the location in which the certain wireless communication device 20 is arranged and the central place of a user who has visited the location and connected his or her user terminal 30 to the wireless communication device 20. The details of this technology are described below.

[2-2. Functions Implemented by Estimation System of Second Embodiment]

Figure 14:
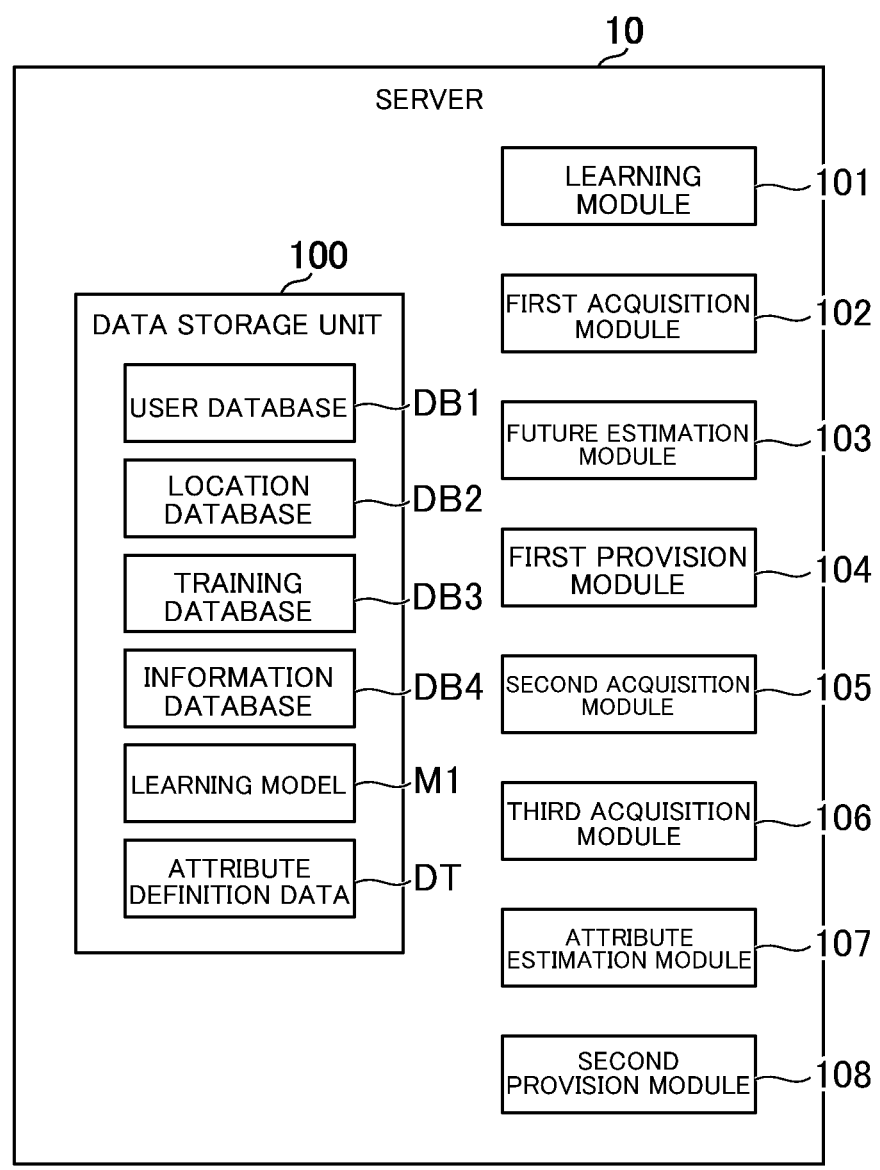
FIG. 14 is a functional block diagram for illustrating an example of functions implemented by an estimation system according to the second embodiment.

FIG. 14 is a functional block diagram for illustrating an example of the functions implemented by the estimation system S according to the second embodiment. In the second embodiment, a case in which the main functions are implemented by the server 10 is described. As illustrated in FIG. 14, a data storage unit 100, a learning module 101, a first acquisition module 102, a future estimation module 103, a first provision module 104, a second acquisition module 105, a third acquisition module 106, an attribute estimation module 107, and a second provision module 108 are implemented by the server 10.

The data storage unit 100 is the same as that in the first embodiment, but a part of the functions are different from those in the first embodiment. The learning module 101, the first acquisition module 102, the future estimation module 103, and the first provision module 104 are the same as those in the first embodiment. The second acquisition module 105, the third acquisition module 106, the attribute estimation module 107, and the second provision module 108 are each mainly implemented by the control unit 11.

The second embodiment is described by taking, like in the first embodiment, a case in which a future central place of the novice user is estimated, but the estimation system S of the second embodiment is not required to have the function relating to estimating the central place, which is described in the first embodiment. That is, the estimation system S of the second embodiment is not required to include the learning module 101, the first acquisition module 102, the future estimation module 103, and the first provision module 104. In this case, the central place of the novice user is not used for estimating the use attribute, and only the central place of a veteran user may be used for estimating the use attribute. When the central place of the novice user has a certain degree of credibility, the central place may be used for estimating the use attribute. In this case, the central place of the novice user is calculated in the same way as that for the veteran user.

[Data Storage Unit]

The data storage unit 100 stores the data required to estimate the use attribute of a location in which a wireless communication device 20 is arranged. The data storage unit 100 also stores attribute definition data DT in addition to the same data as that in the first embodiment. Further, a part of the location database DB2 is different from that in the first embodiment.

FIG. 15 is a table for showing a data storage example of the location database DB2 in the second embodiment. As shown in FIG. 15, the location database DB2 stores the device ID of the wireless communication device 20 arranged in each of a plurality of locations and the use attribute of each of those locations in association with each other. The use attribute is an attribute estimated by the attribute estimation module 107. As shown in FIG. 15, the location attribute is an attribute that can roughly classify the type of industry, for example, of each location, and the use attribute is an attribute that can classify the use, for example, of each location in detail.

FIG. 16 is a table for showing a data storage example of the attribute definition data DT. As shown in FIG. 16, the attribute definition data DT is data defining a relationship between a condition relating to the distance from the central place of a user who has visited a certain location and the use attribute associated with the location when the condition is satisfied. In the example of FIG. 16, the attribute definition data DT defines a two-stage distance range based on one threshold value as the condition. When the distance is less than the threshold value, a use attribute "for neighborhood residents" is defined. When the distance is equal to or longer than the threshold value, a use attribute "for tourists" is defined. Two or more threshold values may be used, and a distance range of three or more stages may be defined in the attribute definition data DT.

[Second Acquisition Module]

The second acquisition module 105 acquires position information on the position of another location visited by the user who has visited an estimation target location, which is the location for which the use attribute is to be estimated. The second acquisition module is an example of a position information acquisition module. Accordingly, the "second acquisition module" as used herein can be read as "position information acquisition module."

The estimation target location may be any location that has been visited by at least one user. In the second embodiment, a location in which a wireless communication device 20 is arranged corresponds to the estimation target location. The estimation target location may be any one of the first location to the third location described in the first embodiment. The estimation target location may be a location other than the first location to the third location, as long as the estimation target location is a location in which the communication service can be used.

The another location is a location different from the estimation target location. The another location is the location used to estimate the use attribute of the estimation target location. The another location may be a location visited by the user before the estimation target location, or may be a location visited by the user after the estimation target location. It is only required that there be at least one another location for each estimation target location.

For an example described with reference to FIG. 13, the estimation target location and the another location are each a shop used by the user. In the second embodiment, the estimation target location can be referred to as "shop to be estimated." The another location can be referred to as "another shop different from the shop to be estimated." The use attribute can be referred to as an "attribute indicating the use of the shop to be estimated."

The position information is information acquired based on the position of the another location. The position information may be acquired based on the position of each of a plurality of other locations, or may be acquired based on the position of certain another location. In the second embodiment, a case in which the position information includes an average central place, which is the average of the central places relating to the position of each of a plurality of other locations visited by each of a plurality of users who had visited the estimation target location, is described.

The position information is not limited to an average central place, and may be other information. For example, at least one of the first position information to the third position information described in the first embodiment may correspond to the position information in the second embodiment. Further, for example, when there is one user who has visited the estimation target location, the central place of a plurality of other locations visited by the user may correspond to the position information. Moreover, for example, the position information may indicate the position of another location visited before or after the user visits the estimation target location. For example, the position information may include the position of each of a plurality of the other locations visited by the user.

In the second embodiment, the second acquisition module 105 identifies a plurality of users who have visited the estimation target location based on the history information stored in the user database DB1. The second acquisition module 105 calculates the average central place based on the central places of at least the plurality of identified users stored in the user database DB1, and acquires the calculated average central place as the position information. Instead of taking the average of the central places of each of the plurality of users, the central place of all of the other locations visited by each of the plurality of users may be calculated as the average central place without the central place of each user.

[Third Acquisition Module]

The third acquisition module 106 acquires a positional relationship between the position of the estimation target location and the position indicated by position information. The third acquisition module is an example of a positional relationship acquisition module. Accordingly, the "third acquisition module" as used herein can be read as "positional relationship acquisition module." As described above, in the second embodiment, the position information includes an average central place, and therefore the third acquisition module 106 acquires the positional relationship between the position of the estimation target location and the average central place.

The positional relationship is a degree of deviation between a certain position and another position. The distance is an example of the positional relationship. Accordingly, the "distance" as used herein can be read as "positional relationship." The positional relationship may be information other than the distance. For example, a vector between the position of the estimation target location and the position indicated by the position information may correspond to the positional relationship. That is, the positional relationship may mean information on both the distance and the direction. As another example, only the direction may correspond to the positional relationship, without including distance information.

In the second embodiment, the third acquisition module 106 acquires the distance between the position of the estimation target location and the average central place as the positional relationship. The distance may be a straight-line distance or a distance considering a travel path of the user. In the second embodiment, there are a plurality of estimation target locations, and therefore the third acquisition module 106 acquires, for each estimation target location, the distance between the position of the relevant estimation target location and the average central place of the plurality of users who have visited the estimation target location.

[Attribute Estimation Module]

The attribute estimation module 107 estimates the use attribute of the estimation target location based on the positional relationship acquired by the third acquisition module 106. In the second embodiment, a relationship between the positional relationship acquired by the third acquisition module 106 and the use attribute of the estimation target location is defined in the attribute definition data DT. The attribute estimation module 107 estimates the use attribute of the estimation target location based on the attribute definition data DT and the positional relationship acquired by the third acquisition module 106.

In FIG. 16, the attribute definition data DT is shown as data having a table format, but the attribute definition data DT may have any data format. For example, the attribute definition data DT may be defined as part of a program code or may be defined by a formula. In addition, for example, like in Modification Example (2-8) of the present disclosure described later, the use attribute can be estimated by using a learning model M2, and therefore the learning model M2 described in Modification Example (2-8) can also be an example of the attribute definition data DT. That is, the attribute definition data DT may have the form of a model using machine learning.

In the second embodiment, the attribute estimation module 107 estimates the use attribute of the estimation target location based on the distance acquired by the third acquisition module 106. The attribute estimation module 107 identifies, based on the attribute definition data DT, a condition satisfied by the distance acquired by the third acquisition module 106, and estimates the use attribute associated with the condition as the use attribute of the estimation target location. In the data storage example of FIG. 16, the attribute estimation module 107 estimates the use attribute "for neighborhood residents" when the distance acquired by the third acquisition module 106 is less than 20 km, and estimates the use attribute "for tourists" when the distance acquired by the third acquisition module 106 is 20 km or longer.

In the second embodiment, a location attribute having a perspective different from that of the use attribute estimated by the estimation attribute module 107 is associated with the estimation target location. The location attribute is an example of another attribute. Accordingly, the "location attribute" as used herein can be read as "another attribute." "Perspective" refers to how the attribute is defined. For example, the location attribute is defined as a first perspective such as the type of industry of the estimation target location, and the use attribute is defined as a second perspective which is the use of the estimation target location.

The location attribute is determined from among a first candidate group in which candidates of the location attribute are defined. For example, the location attribute is determined from among a first candidate group of "convenience store," "train station," "cafe," and "event venue." The use attribute is determined from among a second candidate group in which candidates of the use attribute are defined. For example, the use attribute is determined from among a second candidate group of "for neighborhood residents" and "for tourists." The attribute estimation module 107 estimates the use of the estimation target location as a use attribute different from the location attribute.

The attribute estimation module 107 may estimate the use attribute of the estimation target location by taking into account other factors, such as the location attribute of the estimation target location, the amount of money used by the user, the age of the user, or the usage frequency of the user. Further, the attribute estimated by the attribute estimation module 107 is not limited to the use attribute. The attribute estimation module 107 may be any attribute that can be estimated from the positional relationship acquired by the third acquisition module 106. For example, when the location attribute described in the first embodiment is correlated with the positional relationship, the attribute estimation module 107 may estimate the location attribute. Moreover, for example, the attribute estimation module 107 may estimate the user attribute of a user who visits the estimation target location, or may estimate an attribute indicating a purpose of the visit to the estimation target location by the user.

[Second Provision Module]

The second provision module 108 provides information on the estimation target location to the user based on the use attribute of the estimation target location. For example, the second provision module 108 determines users to which the information on a certain estimation target location is to be provided based on the use attribute of the estimation target location, and provides the information to the determined users. In the example of FIG. 13, for the shop Y, the use attribute "for neighborhood residents" is estimated, and therefore the second provision module 108 provides the information on the shop Y to users having a central place that is less than the threshold value from the shop Y. For the shop Z, the use attribute "for tourists" is estimated, and therefore the second provision module 108 provides the information on the shop Y to users having a central place that is equal to or larger than the threshold value from the shop Z. The second provision module 108 may, instead of determining users to which the information is to be provided based on the use attribute, determine the content per se of the information based on the use attribute.

[2-3. Processing to be Executed by Estimation System of Second Embodiment]

Figure 17:
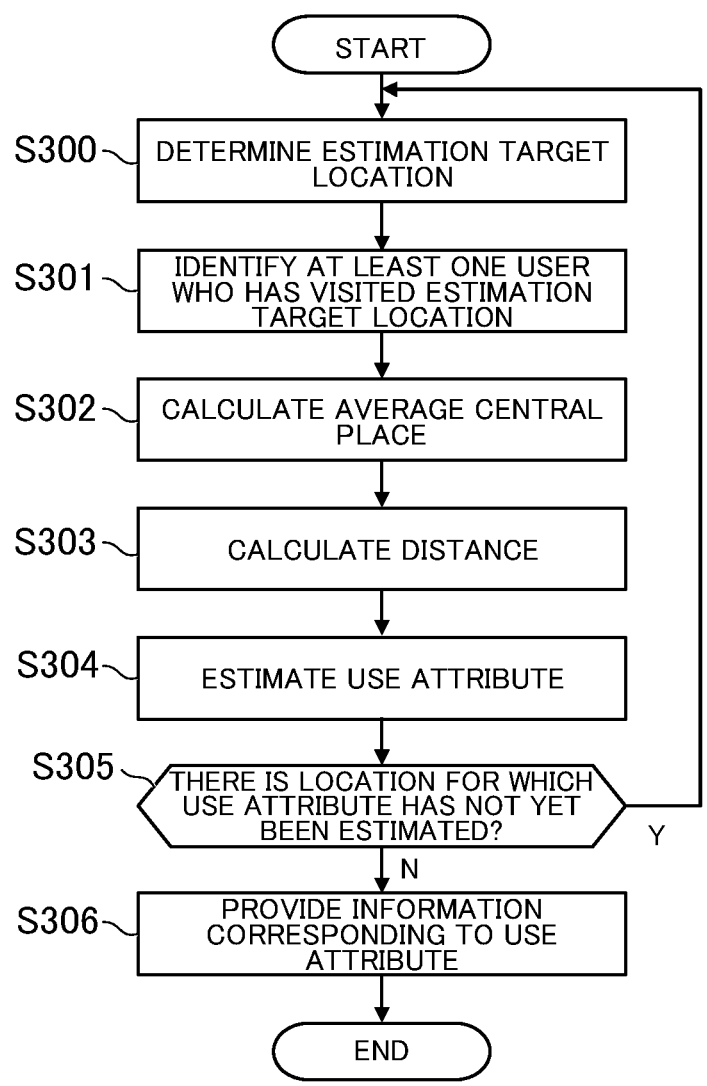
FIG. 17 is a flow chart for illustrating an example of processing to be executed by the estimation system of the second embodiment.

FIG. 17 is a flow chart for illustrating an example of processing to be executed by the estimation system S of the second embodiment. The processing of FIG. 17 is executed by the control unit 11 operating in accordance with the programs stored in the storage unit 12. The processing of FIG. 17 is an example of processing to be executed by the functional blocks illustrated in FIG. 14.

As illustrated in FIG. 17, the server 10 determines the estimation target location from among the locations in which each of the plurality of wireless communication devices 20 is arranged based on the location database DB2 (Step S300). In Step S300, the server 10 selects records of the location database DB2 in order from the beginning, and determines the location corresponding to the record as the estimation target location.

The server 10 identifies at least one user who has visited the estimation target location based on the user database DB1 (Step S301). In Step S301, the server 10 identifies at least one user showing the position of the estimation target location in the history information stored in the user database DB1. In Step S301, there is described a case in which at least one user showing the position of the estimation target location is identified from the pieces of history information for all periods, but at least one user showing the position of the estimation target location may be identified from the pieces of history information for a part of the periods.

The server 10 calculates the average central place based on the central place of the at least one user identified in Step S301 based on the user database DB1 (Step S302). In Step S302, the server 10 calculates the average of the central place of each of the at least one user identified in Step S301 stored in the user database DB1, and acquires the calculated average of such central places as the average central place.

The server 10 calculates the distance between the position of the estimation target location and the average central place calculated in Step S302 (Step S303), estimates the use attribute of the estimation target location based on the distance calculated in Step S303 and the attribute definition data DT, and updates the location database DB2 (Step S304). In Step S304, the server 10 estimates the use attribute associated with the condition satisfied by the distance calculated in Step S303 as the use attribute of the estimation target location.

The server 10 determines whether or not there is a location for which a use attribute has not yet been estimated (Step S305). When it is determined that there is a location for which a use attribute has not yet been estimated (Y in Step S305), the process returns to Step S300. In this case, the next location for which the use attribute is to be estimated is determined, the processing steps of from Step S301 to Step S304 are executed for the location, and the use attribute of the location is estimated.

When it is not determined that there is a location for which a use attribute has not yet been estimated (N in Step S305), the server 10 provides, to each of the plurality of users, information corresponding to the use attribute of each location based on the user database DB1 and the location database DB2 (Step S306), and this process ends.

According to the estimation system S of the second embodiment, a use attribute can be accurately estimated by estimating the use attribute of an estimation target location, which is a location for which the use attribute is to be estimated, based on a positional relationship between the estimation target location and the position indicated by position information on the position of another location visited by the user who has visited the estimation target location. For example, even for a shop having a location attribute of "convenience store," a use attribute indicating how the shop is actually used, such as "for neighborhood residents" or "for tourists," can be estimated. Further, even when the customer base using the shop changes, the change is manifested in the use attribute, and therefore it is possible to flexibly detect a change in the customer base.

Further, the estimation system S can accurately estimate the use attribute by using a simple index, that is, distance, by estimating the use attribute of the estimation target location based on the distance between the position of the estimation target location and the position indicated by the position information.

Further, the estimation system S can accurately estimate the use attribute by taking into account the overall trend of a plurality of users who have visited the estimation target location by acquiring the positional relationship between the position of the estimation target location and the average central place.

Further, the estimation system S can accurately estimate the use attribute from a perspective different from that of a simple industry type by estimating the use of the estimation target location as a use attribute different from the location attribute associated with the estimation target location.

Further, the estimation system S can accurately estimate the use attribute by estimating the use attribute based on the central place usually visited by the user as a reference and by using the central place as estimated in the first embodiment as position information.

Further, the estimation system S can accurately estimate the use attribute of a shop, which is an example of the estimation target location. As a result, how the shop is actually used can be estimated.

The estimation system S can provide useful information to the user by providing information on the estimation target location to the user based on the use attribute of the estimation target location. For example, information corresponding to how the shop is actually used can be provided to the user, and information in which the user is more interested can be provided.

3. Modification Examples

The present disclosure is not limited to the embodiments described above, and can be modified suitably without departing from the spirit of the present disclosure.

Figure 18:
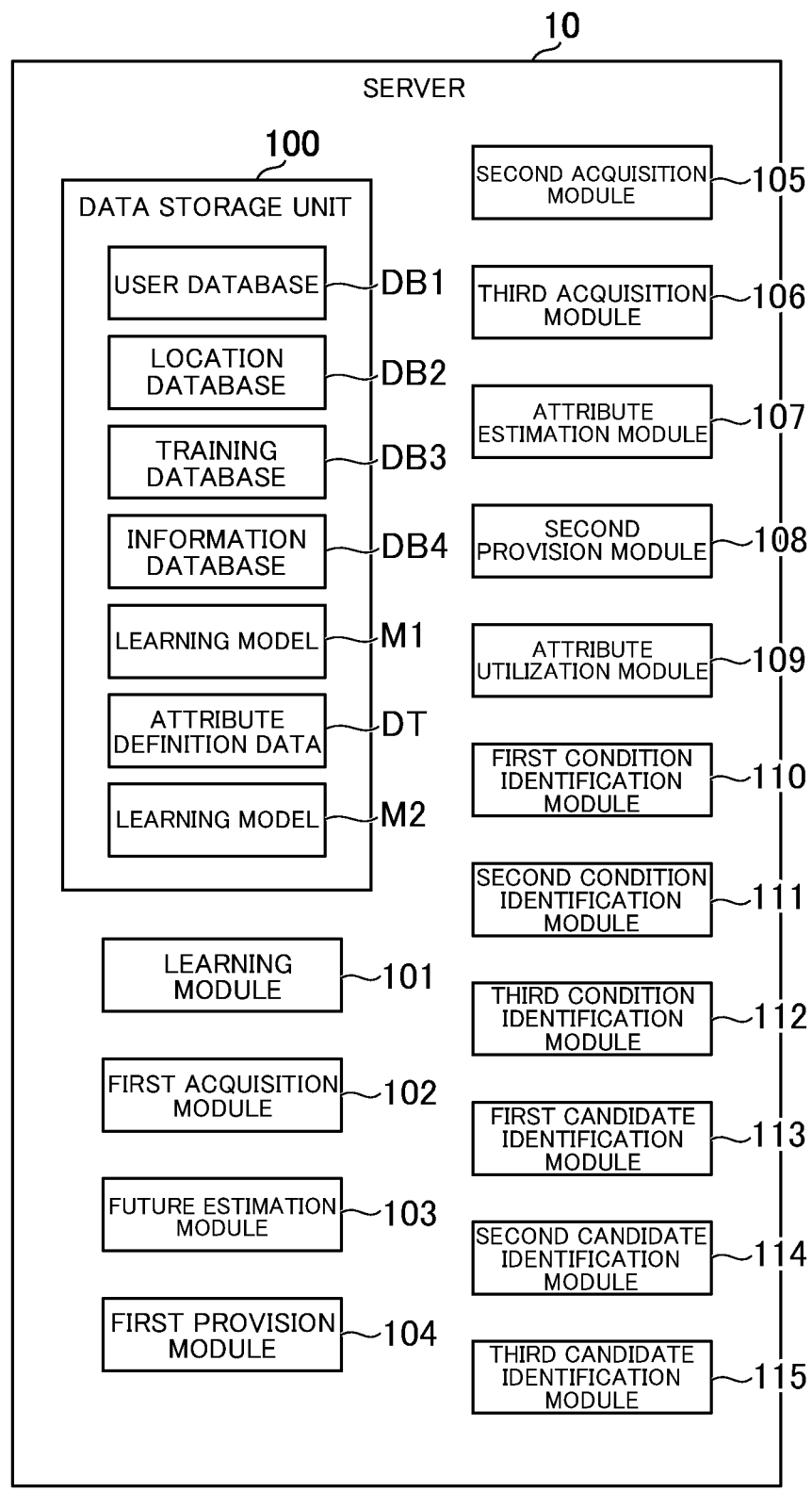
FIG. 18 is a functional block diagram in modification examples of the present disclosure.

FIG. 18 is a functional block diagram in modification examples of the present disclosure. As illustrated in FIG. 18, in addition to the functions described in the first embodiment and the second embodiment, in the modification examples to be described later, an attribute utilization module 109, a first condition identification module 110, a second condition identification module 111, a third condition identification module 112, a first candidate identification module 113, a second candidate identification module 114, and a third candidate identification module 115 are implemented. The functions are each mainly implemented by the control unit 11.

[3-1. Modification Examples of First Embodiment]

(1-1) Modification examples of the first embodiment are now described. For example, when the first embodiment and the second embodiment are combined, the use attribute of the locations actually visited by a novice user for which a future central place has been estimated is estimated. In this case, the estimated use attributes may be utilized in estimating the central place by the learning model M1.

The estimation system S according to Modification Example (1-1) of the present disclosure includes the attribute estimation module 107 and the attribute utilization module 109. The attribute estimation module 107 estimates a fifth location attribute which is the use attribute of a fifth location, which is a position visited by a novice user, based on the positional relationship between the position of the fifth location and the future central place of the novice user.

The fifth location is a location visited by a novice user for which a future central place has been estimated. For example, the fifth location is the location visited by a certain novice user after the central place of the novice user has been estimated. Further, for example, the fifth location may be the location visited by a certain novice user before the central place of the novice user is estimated. That is, the fifth location may be the same as the third location.

The meaning of the positional relationship, the meaning of the use attribute, and the method of estimating the use attribute by the attribute estimation module 107 are as described in the second embodiment. The point that the attribute estimated by the attribute estimation module 107 is not limited to a use attribute is also as described in the second embodiment. In Modification Example (1-1), the second provision module 108 described in the second embodiment may be implemented, or the second provision module 108 may be omitted.

The attribute utilization module 109 utilizes the fifth location attribute estimated by the attribute estimation module 107 to estimate the future central place of the novice user. For example, the attribute utilization module 109 updates the location database DB2 based on the fifth location attribute estimated by the attribute estimation module 107. The updated location database DB2 is used to estimate the future central place of the novice user.

In Modification Example (1-1), not only the location attribute but also the fifth location attribute, which is a use attribute, is input to the learning model M1. The input portion of the training data is information on the location that was visited by a veteran user when the veteran user was a novice user, and therefore the learning module 101 refers to the location database DB2 updated by the attribute utilization module 109, and adds the fifth location attribute of the location visited by the veteran user when the veteran user was a novice user as the input portion of the training data. That is, the fifth location attribute is used as a new feature amount of the input portion of the training data.

The learning module 101 creates training data including the fifth location attribute estimated by the attribute estimation module 107 in the input portion. The learning module 101 trains the learning model M1 based on the training data including the fifth location attribute estimated by the attribute estimation module 107. The fifth location attribute, which is the use attribute of the location visited by the novice user, is also input to the trained learning model M1. Through use of the trained learning model M1 to estimate the future central place of the novice user, the fifth location attribute estimated by the attribute estimation module 107 is used in the estimation. Further, the learning module 101 may create a learning model M1 for each fifth location attribute.

According to Modification Example (1-1), by estimating a fifth location attribute, which is a use attribute, based on the positional relationship between the position of a fifth location visited by a novice user and the future central place of the novice user, and using the estimated fifth location attribute to estimate the future central place of the novice user, the estimation accuracy of the future central place of the novice user can be improved. As described in the second embodiment, the use attribute represents how a shop, for example, is actually used, and therefore it is possible to perform a highly accurate estimation of the central location in accordance with the actual situation of the location visited by the user.

(1-2) Further, for example, in the first embodiment, a case in which the estimation system S is applied to a communication service is described, but the estimation system S can be applied to any other service. Examples of other services may include an electronic payment service, a route guidance service, a restaurant reservation services, a travel reservation service, a ticket reservation service, a financial service, and an insurance service.

In Modification Example (1-2) of the present disclosure, a case in which the estimation system S is applied to an electronic payment service is described. For example, an application for electronic payment (hereinafter referred to as "electronic payment application") is installed on the user terminal 30. The user can perform payment by using any payment means based on the electronic payment application. Examples of the payment means may include electronic money, electronic cash, points, virtual currency, a credit card, a debit card, a bank account, and a wallet.

The user executes electronic payment by holding the user terminal 30 over a reader device arranged in the shop. The electronic payment itself can be executed by any method, for example, a type that reads code information by a camera of the user terminal 30, a type that reads code information displayed on the user terminal 30 by a shop POS terminal or the like, a type that reads an IC chip of the user terminal 30, or a type that can be completed by only an operation on the user terminal 30. Other examples may include electronic payment using an IC card or a magnetic card without using the user terminal 30.

In Modification Example (1-2), history information in the user database DB1 shows the history of a shop in which the user used the electronic payment service in the past. That is, the history information shows the history of electronic payment executed by the user in the past. For example, the history information includes the position, the location attribute, the date and time of use, and the payment amount of money of the shop in which the user used the electronic payment service. The shop in which the user used the electronic payment service corresponds to a location visited by the user. For this reason, each of the first location and the second location in Modification Example (1-2) is a shop used by a veteran user in the past. The third location is a shop used by a novice user in the past, and the fourth location is a shop to be used by the novice user in the future. The learning model M1 has learned the relationship between the first central place which is based on the position of the shop visited when the veteran user was a novice user and the second central place which is based on the shop visited by the veteran user after the first central place.

The future estimation module 103 estimates the central place of a plurality of shops that are likely to be visited by the novice user in the future. The first provision module 102 provides, based on the future central place of a certain novice user, information on a shop existing in the vicinity of the central place to the novice user. For example, the first provision module 102 provides coupon information on a shop existing in the vicinity of the future central place of a certain novice user, or provides recommendation information on the shop.

According to Modification Example (1-2), the estimation accuracy of the central place of a plurality of shops that are likely to be visited by a novice user in the future is increased. As a result, information on shops in which the user may be interested can be provided in advance.

(1-3) For example, the relationship between the input and the output of the learning model M1 is not limited to the example of the first embodiment. It is only required that the learning model M1 learn a relationship between information which is based on some sort of position of a location visited when a certain veteran user was a novice user and information which is based on some sort of position of a location visited by the veteran user later. For example, the learning model M1 may learn a relationship between the position of each of "n" ("n" is a natural number) locations visited when a certain veteran user was a novice user and the central place after the veteran user is no longer a novice user. In this case, when "n" positions are input, the learning model M1 outputs the corresponding central place. When the number of positions input is less than "n", the insufficient position may be treated as a missing value or may be supplemented with a tentative value.

Further, for example, the central place estimated by using the learning model M1 can be used for various purposes other than providing information on the shops in the vicinity of the central place. For example, the central place of a certain user may be compared with a registered home address or work address of the user, and when a change in address due to the user moving house or changing jobs is detected, a message urging a change to the registered home address or work address may be sent. As another example, a change in address due to changing jobs may be detected by comparing the daytime central place of a certain user with the work address of the user, or house-moving may be detected by comparing the weekday night or holiday central place of a certain user with the home address of the user.

Further, for example, a degree of contribution to the learning model M1 may be reduced for locations that have a low relevancy with the location attribute of the locations that are normally visited by the novel user for which the future central place is to be estimated. For example, a future central place of the novice user may be estimated for each time period and day of the week, and information corresponding to the time period and the day of the week may be provided. In this case, information on a location having a different location attribute may be provided for each time period and day of the week. For example, information on a restaurant or a cafe, for example, that can be used on weekday daytimes may be provided based on the weekday daytime central place of the novice user. In addition, for example, information on a supermarket or a convenience store, for example, that can be used on weekday nights may be provided based on the weekday night central place of the novice user.

Further, for example, the usage count of a user may be calculated for each time period or day of the week, and the central place estimated for the time period or day of the week having the highest usage count may be acquired as the overall central place of the user. For example, when the central place of a certain user is urban, information on a location relatively close to the central place may be presented. In addition, for example, when the central place of a certain user is provincial, information on a location relatively far from the central place may be presented. Moreover, for example, information may be presented to a certain user based on a normal range of action corresponding to the central place and degree of variation of the user. In this case, information on a relatively narrow range may be presented to a user having a narrow normal range of action, and information on a relatively wide range may be presented to a user having a wide normal range of action.

[3-2. Modification Examples of Second Embodiment]

(2-1) Modification examples of the second embodiment are now described. For example, depending on the area of the location in which the wireless communication device 20 is arranged, the condition for estimating the use attribute may be different. For example, provincial users often have a longer travel distance in daily life than urban users. Accordingly, when the area of the location in which the wireless communication device 20 is arranged is provincial, the threshold value to be used when the use attribute is estimated may be increased, and when the area in which the wireless communication device 20 is arranged is urban, the threshold value to be used when the use attribute is estimated may be reduced.

FIG. 19 is a table for showing a data storage example of the attribute definition data DT in Modification Example (2-1) of the present disclosure. As shown in FIG. 19, in the attribute definition data DT in Modification Example (2-1), for each area, a condition for estimating the use attribute and a candidate for the use attribute are associated with each other. The area may be a region having a fixed size, for example, the area may be divided based on the perspective of whether the area is urban or provincial, or the area may be divided based on the perspective of whether the area is a business district or a residential district. In the example of FIG. 19, a case in which candidates for the use attribute associated with each area are the same is described, but the candidates for the use attribute may be different for each area, like in Modification Example (2-4) of the present disclosure described later.

The first condition identification module 110 identifies the condition for estimating the use attribute based on the area to which the estimation target location belongs from among a plurality of areas. The first condition identification module 110 identifies the position of the estimation target location based on the location database DB2, and identifies the area to which the identified position belongs from among the plurality of areas. The first condition identification module 110 identifies the condition associated with the identified area based on the attribute definition data DT.

The attribute estimation module 107 estimates the use attribute of the estimation target location based on the condition identified by the first condition identification module 110 and the positional relationship acquired by the third acquisition module 106. This is different from the second embodiment in that the condition identified by the first condition identification module 110 is used in the estimation. The method itself of estimating the use attribute is as described in the second embodiment.

According to Modification Example (2-1), by estimating the use attribute of the estimation target location based on a condition identified based on the area to which the estimation target location belongs and the positional relationship acquired by the third acquisition module 106, the use attribute is estimated based on a condition corresponding to the area, and the estimation accuracy of the use attribute is increased. For example, this means that a location which a user in a provincial area takes two hours by car to travel to is estimated to be "for neighborhood residents" instead of "for tourists," and a location which a user in an urban area takes two hours by car to travel to is estimated to be "for tourists" instead of "for neighborhood residents."

(2-2) Further, for example, the condition for estimating the use attribute may be different depending on the location attribute associated with the location in which the wireless communication device 20 is arranged. For example, users who visit the location attribute of "outlet mall" often have a longer travel distance than users who visit the location attribute of "convenience store." For that reason, when the location attribute of the location in which the wireless communication device 20 is arranged is "outlet mall," the threshold value to be used when the use attribute is estimated may be increased, and when the location attribute in which the wireless communication device 20 is arranged is "convenience store," the threshold value to be used when the use attribute is estimated may be reduced.

FIG. 20 is a table for showing a data storage example of the attribute definition data DT in Modification Example (2-2) of the present disclosure. As shown in FIG. 20, in the attribute definition data DT in Modification Example (2-2), for each location attribute, a condition for estimating the use attribute and a candidate for the use attribute are associated with each other. In the example of FIG. 20, a case in which candidates for the use attribute associated with each location attribute are the same is described, but the candidates for the use attribute may be different for each location attribute, like in Modification Example (2-5) described later.

The second condition identification module 111 identifies the condition for estimating the use attribute based on the location attribute associated with the estimation target location from among the plurality of location attributes. The second condition identification module 111 identifies the location attribute of the estimation target location based on the location database DB2. The first condition identification module 110 identifies the condition associated with the identified location attribute based on the attribute definition data DT.

The attribute estimation module 107 estimates the use attribute of the estimation target location based on the condition identified by the second condition identification module 111 and the positional relationship acquired by the third acquisition module 106. This is different from the second embodiment in that the condition identified by the second condition identification module 111 is used in the estimation. The method itself of estimating the use attribute is as described in the second embodiment.

According to Modification Example (2-2), by estimating the use attribute of the estimation target location based on a condition identified based on the location attribute associated with the estimation target location and the positional relationship acquired by the third acquisition module 106, the use attribute is estimated based on a condition corresponding to the location attribute, and the estimation accuracy of the use attribute is increased. As a result, this means that a shop in an outlet mall which a user takes two hours by train to travel to is estimated to be "for normal shopping" instead of "for tourists," and a convenience store in a tourist district which a user takes two hours by train to travel to is estimated to be "for tourists" instead of "for normal shopping."

(2-3) Further, for example, the condition for estimating the use attribute may be different depending on the degree of variation in the distance between the central place of a user who has visited locations in which wireless communication devices 20 are arranged and the position of each location. For example, when the degree of variation of a user who has visited a certain location is large, a larger threshold value may be set because the location is a location that is easily visited by users who like to travel far. For example, when the degree of variation of a user who has visited a certain location is small, a smaller threshold value may be set because the location is a location that is easily visited by users who do not normally travel far.

FIG. 21 is a table for showing a data storage example of the attribute definition data DT in Modification Example (2-3) of the present disclosure. As shown in FIG. 21, in the attribute definition data DT in Modification Example (2-3), for each degree of variation, a condition for estimating the use attribute and a candidate for the use attribute are associated with each other. In the example of FIG. 21, a case in which candidates for the use attribute associated with each degree of variation are the same is described, but the candidates for the use attribute may be different for each degree of variation, like in Modification Example (2-6) of the present disclosure described later.

The third condition identification module 112 identifies the condition for estimating the use attribute based on the degree of variation in the distance between the central place for a plurality of other locations visited by a user and the position of each of the plurality of other locations. The third condition identification module 112 acquires the degree of variation of the user based on the central place of users who have visited a certain location acquired based on the user database DB1 and the position included in the history information on those users. The third condition identification module 112 calculates the average of the degree of variation of the users who have visited a certain location, and identifies the condition associated with the calculated average degree of variation.

The attribute estimation module 107 estimates the use attribute of the estimation target location based on the condition identified by the third condition identification module 112 and the positional relationship acquired by the third acquisition module 106. This is different from the second embodiment in that the condition identified by the third condition identification module 112 is used in the estimation. The method itself of estimating the use attribute is as described in the second embodiment.

According to Modification Example (2-3), by estimating the use attribute of the estimation target location based on a condition identified based on the degree of variation in the distance between the central place for a plurality of other locations visited by the user and the position of each of the plurality of other locations, and the positional relationship acquired by the third acquisition module 106, the use attribute is estimated based on the condition corresponding to the degree of variation, and the estimation accuracy of the use attribute is increased. For example, this means that a restaurant visited by users who regularly like to eat even when such visit requires the user to travel far (users having a large degree of variation) is estimated to be "for gourmet users" instead of "for tourists," and a restaurant visited by users who do not normally travel far (users having a small degree of variation) is estimated to be "for tourists" instead of "for gourmet users."

(2-4) Further, for example, depending on the area of the location in which a wireless communication device 20 is arranged, there may be cases in which it is better to associate a use attribute specific to that area. In the attribute definition data DT in Modification Example (2-4), for each area, use attribute candidates are associated with the area. The format of the attribute definition data DT itself is the same as that of FIG. 19, but the use attribute candidates are different for each area. For example, the candidates "for tourists" and "for neighborhood residents" are associated with the "provincial" area. In addition, for example, the candidates "for entertaining neighborhood companies" and "for dating" are associated with the "urban" area.

The first candidate identification module 113 identifies a plurality of candidates of the use attribute based on the area to which the estimation target location belongs from among a plurality of areas. The first candidate identification module 113 identifies the position of the estimation target location based on the location database DB2, and identifies the area to which the identified position belongs from among the plurality of areas. The first candidate identification module 113 identifies the candidates associated with the identified area based on the attribute definition data DT.

The attribute estimation module 107 estimates the use attribute of the estimation target location from among a plurality of candidates identified by the first candidate identification module 113 based on the positional relationship acquired by the third acquisition module 106. This is different from the second embodiment in that the candidates identified by the first candidate identification module 113 are used in the estimation. The method itself of estimating the use attribute is as described in the second embodiment.

According to Modification Example (2-4), a use attribute corresponding to the area can be estimated by estimating the use attribute of the estimation target location from among a plurality of candidates identified based on the area to which the estimation target location belongs. For example, in the case of a provincial restaurant, the use attribute is estimated from among the candidates "for tourists" and "for neighborhood residents," and in the case of an urban restaurant, the use attribute is estimated from among the candidates "for entertaining neighborhood companies" and "for dating."

(2-5) Further, for example, depending on the location attribute associated with the location in which a wireless communication device 20 is arranged, there may be cases in which it is better to associate a use attribute specific to that location attribute. In the attribute definition data DT in Modification Example (2-5), for each location attribute, use attribute candidates are associated with the location attribute. The format of the attribute definition data DT itself is the same as that of FIG. 20, but the use attribute candidates are different for each location attribute. For example, the candidates "for tourists" and "for neighborhood residents" are associated with the location attribute of the "shopping mall." In addition, for example, the candidates "for entertaining neighborhood companies" and "for dating" are associated with the location attribute of the "restaurant."

The second candidate identification module 114 identifies the plurality of candidates of the use attribute based on the location attribute associated with the estimation target location from among the plurality of location attributes. The second candidate identification module 114 identifies the location attribute of the estimation target location based on the location database DB2. The second candidate identification module 114 identifies the candidate associated with the identified location attribute based on the attribute definition data DT.

The attribute estimation module 107 estimates the use attribute of the estimation target location from among a plurality of candidates identified by the second candidate identification module 114 based on the positional relationship acquired by the third acquisition module 106. This is different from the second embodiment in that the candidates identified by the second candidate identification module 114 are used in the estimation. The method itself of estimating the use attribute is as described in the second embodiment.

According to Modification Example (2-5) of the present disclosure, a use attribute corresponding to the location attribute associated with the estimation target location can be estimated by estimating the use attribute of the estimation target location from among a plurality of candidates identified based on the location attribute associated with the estimation target location. For example, in the case of the shop having the location attribute "shopping mall," the use attribute is estimated from among the candidates "for tourists" and "for neighborhood residents," and in the case of the shop having the location attribute "restaurant," the use attribute is estimated from among the candidates "for entertaining neighborhood companies" and "for dating."

(2-6) Further, for example, depending on the degree of variation in the distance between the central place of a user who has visited locations in which wireless communication devices 20 are arranged and the position of each location, there may be cases which it is better to associate a use attribute specific to that degree of variation. In the attribute definition data DT in Modification Example (2-6) of the present disclosure, for each degree of variation, use attribute candidates are associated with the degree of variation. The format of the attribute definition data DT itself is the same as that of FIG. 21, but the use attribute candidates are different for each degree of variation. For example, the candidates "for gourmet users" and "for neighborhood residents" are associated with a relatively large degree of variation. In addition, for example, the candidates "for tourists" and "for neighborhood residents" are associated with a relatively small degree of variation.

The third candidate identification module 115 identifies the plurality of candidates of the use attribute based on the degree of variation in the distance between the central place for a plurality of other locations visited by a user and the position of each of the plurality of other locations. The third candidate identification module 115 acquires the degree of variation of the user based on the central place of users who have visited a certain location acquired based on the user database DB1 and the position included in the history information on those users. The third candidate identification module 115 calculates the average of the degree of variation of the users who have visited a certain location, and identifies the candidates associated with the calculated average degree of variation.

The attribute estimation module 107 estimates the use attribute of the estimation target location from among a plurality of candidates identified by the third candidate identification module 115 based on the positional relationship acquired by the third acquisition module 106. This is different from the second embodiment in that the candidates identified by the third candidate identification module 115 are used in the estimation. The method itself of estimating the use attribute is as described in the second embodiment.

According to Modification Example (2-6), a use attribute corresponding to the degree of variation can be estimated by estimating the use attribute of the estimation target location from among a plurality of candidates identified based on the degree of variation in the distance between the central place for a plurality of other locations visited by the user and the position of each of the plurality of other locations. For example, when the degree of variation of a user who has visited a certain location is large, the use attribute is estimated from the candidates "for gourmet users" and "for neighborhood residents," and when the degree of variation of the user who has visited a certain location is small, the use attribute is estimated from among the candidates "for tourists" and "for neighborhood residents."

(2-7) Further, for example, the second acquisition module 105 may acquire position information based on the positions of other locations associated with the same location attribute as that of the estimation target location among the plurality of other locations visited by the user. For example, when a location attribute, such as "restaurant" or "convenience store," is defined in advance, the second acquisition module 105 calculates the central place of the user based on the positions of other shops associated with the same position location attribute as that of the shop to be estimated.

For example, when the location attribute of the shop to be estimated is "restaurant," the position of a "convenience store" visited by the user may not be important in estimating the use attribute, and therefore the second acquisition module 105 excludes the position of such a shop from the calculation of the central place or reduces the weighting of such a shop in the calculation of the central place. When the location attribute of the shop to be estimated is "convenience store," the position of a "restaurant" visited by the user may not be important in estimating the use attribute, and therefore the second acquisition module 105 excludes the position of such a shop from the calculation of the central place or reduces the weighting of such a shop in the calculation of the central place.

According to Modification Example (2-7) of the present disclosure, the estimation accuracy of the use attribute is increased by acquiring the central place of a user based on the positions of other locations associated with the same location attribute as that of the estimation target location. For example, in order to estimate the use attribute of the estimation target location having the location attribute "convenience store," the central place at the time when the user visited a location having the same location attribute "convenience store" is likely to be more suitable than the central place at the time when the user visited a location having the location attribute "cafe," and therefore by taking into account the location attribute, the estimation accuracy of the use attribute is effectively increased. In addition, when it is desired to provide information on "convenience store" to the user, more useful information can be provided.

(2-8) Further, for example, the attribute estimation module 107 may estimate a use attribute based on a learning model M2 which has learned a relationship between a positional relationship corresponding to another estimation target location and a use attribute associated with the another estimation target location. The learning model M2 has learned a relationship between the distance corresponding to another estimation target location for which the use attribute that becomes the correct answer is known (the distance acquired by the third module acquisition 106) and the use attribute that becomes the correct answer. The attribute estimation module 107 inputs the distance corresponding to the estimation target location acquired by the third acquisition module 106 to the learning model M2, and acquires the use attribute output from the learning model M2. The learning model M2 may also learn, for example, the conditions and candidates described in Modification Example (2-1) to Modification Example (2-7).

According to Modification Example (2-8), the estimation accuracy of the use attribute is effectively increased by estimating the use attribute based on the learning model M2. For example, by using the learning model M2 instead of using a fixed threshold value, for example, specified by the administrator, the learning model M2 naturally learns changes in the trend of a user, and the change is reflected in the estimation of the use attribute. As a result, the use attribute in accordance with the actual situation can be estimated.

(2-9) Further, even in the second embodiment, like in Modification Example (1-1), the attribute utilization module 109 may utilize the use attribute of the estimation target location to estimate the fourth position information. The details of the attribute utilization module 109 are as described in Modification Example (1-1).

According to Modification Example (2-9) of the present disclosure, by using the use attribute of the estimation target location to estimate the future central place of the novice user, the estimation accuracy of the future central place of the novice user can be improved. The use attribute represents how a shop, for example, is actually used, and therefore it is possible to perform a highly accurate estimation of the central location in accordance with the actual situation of the location visited by the user.

(2-10) Further, for example, the locations visited by a user may be different on the weekend, which is a holiday for the user, for example, and therefore the central place of the user may be calculated based on the locations visited by the user on weekdays. For example, when the user goes on a trip on the weekend, the correct central place may not be calculated based on the locations visited at that time, and therefore the central place may be calculated based on the locations visited by the user on weekdays.

In addition, for example, when a certain estimation target location is used by neighborhood residents of the estimation target location as well as by tourist users who live far from the estimation target location, a distance distribution may be calculated by using a mixed normal distribution. In this case, a probability indicating which distribution peak each of the estimation target location and each user belongs to may be estimated, and it may be assumed that the users belong to the peaks having a higher probability. The number of peaks can be defined in various ways. For example, when it is determined in advance to distinguish only between neighborhood residents and tourist users, the distribution may be assumed to be a mixed distribution of two normal distributions. In other cases (when the users are divided into three or more groups), a suitable number of distribution peaks may be estimated by using various information criteria, such as Akaike information criterion (AIC), Bayesian information criterion (BIC), and minimum description length (MDL). In the above-mentioned mixed normal distribution, the meaning of each distribution peak may be changed depending on the location attribute and the number of location attributes. In this case, the distribution may be divided into a plurality of clusters when the mean and the variance are aggregated into shops having the same location attribute. With this configuration, it is possible to define how the distribution may be divided based on each location attribute.

[3-3. Other Modification Examples]

Further, for example, the modification examples described above may be combined. In addition, for example, a case in which the main functions are implemented by the server 10 has been described, but each function may be shared by a plurality of computers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An estimation system, comprising:
   at least one memory configured to store program code;
   at least one processor configured to operate as instructed by the program code, the program code including:
   acquisition code configured to cause at least one of the at least one processor to:
      acquire position information on a position of another location visited by a user who has visited an estimation target location which is a location for which an attribute is to be estimated, and
      acquire a positional relationship between a position of the estimation target location and the position indicated by the position information; and
   estimation code configured to cause at least one of the at least one processor to estimate the attribute of the estimation target location based on the positional relationship,
   wherein the position information includes an average central place which is an average of a central place for the position of each of a plurality of other locations visited by each of a plurality of users.

2. The estimation system according to claim 1,
   wherein the acquisition code is further configured to cause at least one of the at least one processor to acquire, as the positional relationship, a distance between the position of the estimation target location and the position indicated by the position information, and
   wherein the estimation code is further configured to cause at least one of the at least one processor to estimate the attribute of the estimation target location based on the distance.

3. The estimation system according to claim 1,
   wherein the acquisition code is further configured to cause at least one of the at least one processor to acquire the positional relationship between the position of the estimation target location and the average central place.

4. The estimation system according to claim 1,
   wherein the estimation code is further configured to cause at least one of the at least one processor to:
      identify a condition for estimating the attribute based on one of a plurality of areas to which the estimation target location belongs, and
      estimate the attribute of the estimation target location based on the condition and the positional relationship.

5. The estimation system according to claim 1,
   wherein another attribute having a perspective different from a perspective of the attribute is associated with the estimation target location, and
   wherein the estimation code is further configured to cause at least one of the at least one processor to:
      identify a condition for estimating the attribute based on one of a plurality of other attributes that is associated with the estimation target location, and
      estimate the attribute of the estimation target location based on the condition and the positional relationship.

6. The estimation system according to claim 1,
   wherein the estimation code is further configured to cause at least one of the at least one processor to:
      identify a condition for estimating the attribute based on a degree of variation in a distance between a central place for a plurality of other locations visited by the user and the position of each of the plurality of other locations, and
      estimate the attribute of the estimation target location based on the condition and the positional relationship.

7. The estimation system according to claim 1,
   wherein the estimation code is further configured to cause at least one of the at least one processor to:
      identify a plurality of candidates of the attribute based on one of a plurality of areas to which the estimation target location belongs, and
      estimate, from among the plurality of candidates, the attribute of the estimation target location based on the positional relationship.

8. The estimation system according to claim 1,
   wherein another attribute having a perspective different from a perspective of the attribute is associated with the estimation target location, and
   wherein the estimation code is further configured to cause at least one of the at least one processor to:
      identify a plurality of candidates of the attribute based on one of a plurality of other attributes that is associated with the estimation target location, and
      estimate, from among the plurality of candidates, the attribute of the estimation target location based on the positional relationship.

9. The estimation system according to claim 1,
   wherein the estimation code is further configured to cause at least one of the at least one processor to:
      identify a plurality of candidates of the attribute based on a degree of variation in a distance between a central place for a plurality of other locations visited by the user and the position of each of the plurality of other locations, and
      estimate, from among the plurality of candidates, the attribute of the estimation target location based on the positional relationship.

10. The estimation system according to claim 1,
    wherein another attribute having a perspective different from a perspective of the attribute is associated with the estimation target location, and
    wherein the estimation code is further configured to cause at least one of the at least one processor to estimate a use of the estimation target location as the attribute different from the another attribute.

11. The estimation system according to claim 1,
    wherein another attribute having a perspective different from a perspective of the attribute is associated with the estimation target location, and
    wherein the acquisition code is further configured to cause at least one of the at least one processor to acquire the position information based on the position of, from among a plurality of other locations visited by the user, one of the plurality of other locations that is associated with the same another attribute as the another attribute of the estimation target location.

12. The estimation system according to claim 1, wherein the estimation code is further configured to cause at least one of the at least one processor to estimate the attribute based on a learning model that has learned a relationship between the positional relationship corresponding to another estimation target location and the attribute associated with the another estimation target location.

13. The estimation system according to claim 1,
wherein the at least one memory is further configured to store a learning model that has learned a relationship between first position information based on a position of a first location which is a location visited by a first user in past, and second position information based on a position of a second location which is a location visited by the first user after the first location,
wherein the acquisition code is further configured to cause at least one of the at least one processor to:
acquire third position information based on a position of a third location which is a location visited by a second user in the past;
acquire, as an estimation result of fourth position information based on a position of a fourth location which corresponds to a predicted central place for locations that the second user is predicted to visit in the future, output of the learning model corresponding to the third position information; and
acquire the position information based on the fourth position information.

14. The estimation system according to claim 13, wherein the estimation code is further configured to cause at least one of the at least one processor to use the attribute of the estimation target location to estimate the fourth position information.

15. The estimation system according to claim 1,
wherein each of the estimation target location and the another location is a shop used by the user,
wherein the estimation target location is a shop to be estimated,
wherein the another location is another shop different from the shop to be estimated, and
wherein the attribute is a use of the shop to be estimated.

16. The estimation system according to claim 1, wherein the program code further includes:
providing code configured to cause at least one of the at least one processor to provide information on the estimation target location to the user based on the attribute of the estimation target location.

17. An estimation method, performed by at least one processor and comprising:
acquiring position information on a position of another location visited by a user who has visited an estimation target location which is a location for which an attribute is to be estimated;
acquiring a positional relationship between a position of the estimation target location and the position indicated by the position information; and
estimating the attribute of the estimation target location based on the positional relationship,
wherein the position information includes an average central place which is an average of a central place for the position of each of a plurality of other locations visited by each of a plurality of users.

18. A non-transitory information storage medium for storing a program that when executed by at least one processor, causes the at least one processor to:
acquire position information on a position of another location visited by a user who has visited an estimation target location which is a location for which an attribute is to be estimated;
acquire a positional relationship between a position of the estimation target location and the position indicated by the position information; and
estimate the attribute of the estimation target location based on the positional relationship,
wherein the position information includes an average central place which is an average of a central place for the position of each of a plurality of other locations visited by each of a plurality of users.

* * * * *